(12) United States Patent
Takashima et al.

(10) Patent No.: US 11,533,176 B2
(45) Date of Patent: Dec. 20, 2022

(54) DECRYPTION DEVICE, ENCRYPTION DEVICE, AND CRYPTOGRAPHIC SYSTEM

(71) Applicants: Mitsubishi Electric Corporation, Tokyo (JP); NIPPON TELEGRAPH AND TELEPHONE CORPORATION, Tokyo (JP)

(72) Inventors: Katsuyuki Takashima, Tokyo (JP); Junichi Tomida, Tokyo (JP)

(73) Assignees: Mitsubishi Electric Corporation, Tokyo (JP); Nippon Telegraph and Telephone Corporation, Tokyo (JP)

( * ) Notice: Subject to any disclaimer, the term of this patent is extended or adjusted under 35 U.S.C. 154(b) by 116 days.

(21) Appl. No.: 17/072,823

(22) Filed: Oct. 16, 2020

(65) Prior Publication Data

US 2021/0036852 A1  Feb. 4, 2021

Related U.S. Application Data

(63) Continuation of application No. PCT/JP2019/019248, filed on May 15, 2019.

(30) Foreign Application Priority Data

Jun. 11, 2018 (JP) .............................. JP2018-110987

(51) Int. Cl.
*H04L 9/30* (2006.01)
*H04L 9/08* (2006.01)
*H04L 9/12* (2006.01)

(52) U.S. Cl.
CPC ............ *H04L 9/3006* (2013.01); *H04L 9/085* (2013.01); *H04L 9/0869* (2013.01); *H04L 9/12* (2013.01)

(58) Field of Classification Search
CPC ..... H04L 9/3006; H04L 9/085; H04L 9/0869; H04L 9/12; H04L 9/30; H04L 9/3073
See application file for complete search history.

(56) References Cited

U.S. PATENT DOCUMENTS

2011/0194693 A1* 8/2011 Izu .................. H04L 9/0637
380/255
2014/0233726 A1* 8/2014 Yajima .............. H04L 9/008
380/28

(Continued)

FOREIGN PATENT DOCUMENTS

JP        2013-217970 A    10/2013
WO    WO 2016/113878 A1    7/2016

OTHER PUBLICATIONS

Extended European Search Report for European Application No. 19819297.3, dated May 28, 2021.

(Continued)

*Primary Examiner* — Sanchit K Sarker
(74) *Attorney, Agent, or Firm* — Birch, Stewart, Kolasch & Birch, LLP

(57) ABSTRACT

An inner-product functional encryption scheme in which the maximum length of a ciphertext and the maximum length of a secret key are not restricted can be constructed. An encryption device (20) generates a ciphertext $ct_x$ in which a vector x is encrypted, using encryption setting information that is of a size depending on the size of the vector x and is generated using as input public information of a fixed size. A key generation device (30) generates a secret key $sk_y$ in which a vector y is set, using key setting information that is of a size depending on the size of the vector y and is generated using as input the public information. A decryption device (40) decrypts the ciphertext $ct_x$ with the secret key $sk_y$ to calculate an inner-product value of the vector x and the vector y.

9 Claims, 14 Drawing Sheets

(56) References Cited

U.S. PATENT DOCUMENTS

| | | | |
|---|---|---|---|
| 2014/0301546 A1* | 10/2014 | Chevallier-Mames | ..................... H04L 9/0637 380/28 |
| 2015/0081617 A1* | 3/2015 | Shaik | ................. G06Q 30/0241 707/602 |
| 2019/0312853 A1* | 10/2019 | Vaish | ........................ H04L 9/30 |
| 2021/0234676 A1* | 7/2021 | Takashima | ............ H04L 9/0847 |
| 2022/0058198 A1* | 2/2022 | Dupont | ............... G06F 16/2455 |
| 2022/0103338 A1* | 3/2022 | Brooker | ................ H04L 9/0631 |

OTHER PUBLICATIONS

Sans et al., "Unbounded Inner Product Functional Encryption, with Succinct Keys", IACR, International Association for Cryptologic Research, vol. 20180523:025542, May 19, 2018, pp. 1-15.

Abdalla et al., "Simple functional encryption schemes for inner products", J. Katz (Ed.): PKC 2015, LNCS, 2015, vol. 9020, pp. 733-751, Springer, Heidelberg.

Agrawal et al., "Fully secure functional encryption for inner products, from standard assumptions", M. Robshaw and J. Katz (Eds.): CRYPTO 2016, Part III, LNCS, 2016, vol. 9816, pp. 333-362, Springer, Heidelberg.

Datta et al., "Full-hiding (unbounded) multi-input inner product functional encryption from the k-linear assumption", Cryptology ePrint Archive: Report 2018/061, 2018, total 39 pages, https://eprint.iacr.org/2018/061.

International Search Report for PCT/JP2019/019248 dated Aug. 20, 2019.

Okamoto et al., "Fully secure unbounded inner-product and attribute-based encryption", X. Wang and X. Sako (Eds.): ASIACRYPT 2012, LNCS, 2012, vol. 7658, pp. 349-366, Springer, Heidelberg.

Tomida et al., "Unbounded Inner Product Functional Encryption from Bilinear Maps", Cryptology ePrint Archive: Report 2018/696, published after Jun. 11, 2018 before May 15, 2019, total 26 pages.

Japanese Office Action for Japanese Application No. 2018-110987, dated Aug. 17, 2021, with English translation.

\* cited by examiner

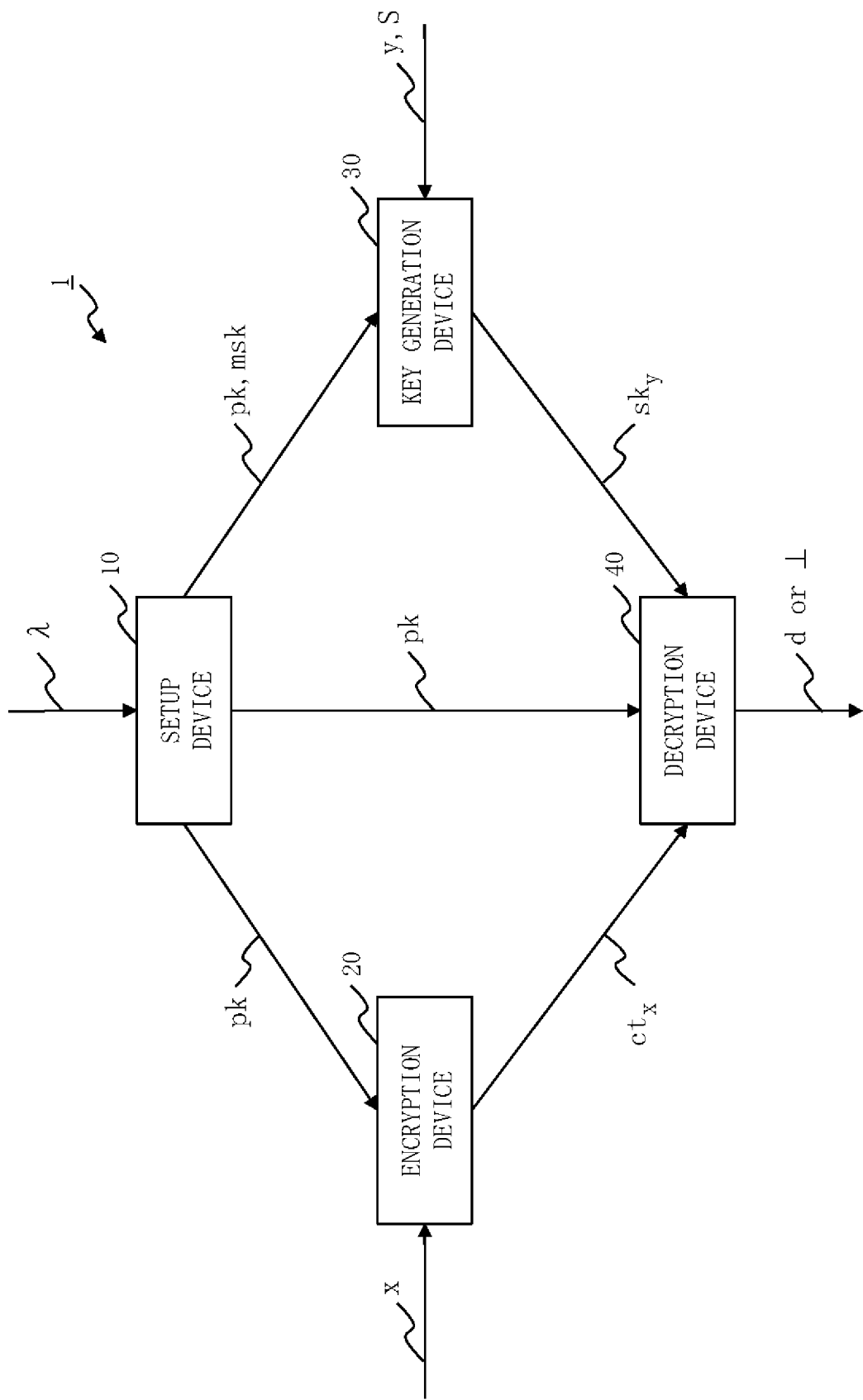

DECRYPTION DEVICE, ENCRYPTION DEVICE, AND CRYPTOGRAPHIC SYSTEM

CROSS REFERENCE TO RELATED APPLICATIONS

This application is a Continuation of PCT International Application No. PCT/JP2019/019248, filed on May 15, 2019, which claims priority under 35 U.S.C. 119(a) to Patent Application No. 2018-110987, filed in Japan on Jun. 11, 2018, all of which are hereby expressly incorporated by reference into the present application.

TECHNICAL FIELD

The present invention relates to inner-product functional encryption (hereinafter IPFE).

BACKGROUND ART

Non-Patent Literature 1 describes an IPFE scheme. IPFE is very useful for performing practical statistical processing and information processing while protecting privacy.

CITATION LIST

Non-Patent Literature

Non-Patent Literature 1: Abdalla, M., Bourse, F., De Caro, A., Pointcheval, D.: Simple functional encryption schemes for inner products. In: Katz, J. (ed.) PKC 2015. LNCS, vol. 9020, pp. 733-751. Springer, Heidelberg (March/April 2015)

SUMMARY OF INVENTION

Technical Problem

In the IPFE scheme described in Non-Patent Literature 1, the maximum lengths of vectors used in the scheme are fixed by master keys generated in a setup phase. That is, the maximum length of a ciphertext and the maximum length of a secret key used in the scheme are fixed. After the maximum lengths are fixed, a ciphertext and a secret key exceeding a corresponding one of the lengths cannot be handled.

There may be a case in which details of data to be encrypted or details of information processing to be performed using a ciphertext have not been decided in the setup phase. In this case, it is difficult to decide the maximum length of a ciphertext and the maximum length of a secret key. Setting the maximum lengths to be very long may be considered. However, this will result in unnecessary degradation in efficiency.

It is an object of the present invention to allow construction of an IPFE scheme in which the maximum length of a ciphertext and the maximum length of a secret key are not restricted.

Solution to Problem

A decryption device according to the present invention includes:

a ciphertext acquisition unit to acquire a ciphertext $ct_x$ in which a vector x is encrypted using encryption setting information of a size depending on a size of the vector x, the encryption setting information being generated using as input public information of a fixed size;

a secret key acquisition unit to acquire a secret key $sk_y$ in which a vector y is set using key setting information of a size depending on a size of the vector y, the key setting information being generated using as input the public information; and a decryption unit to decrypt the ciphertext $ct_x$ acquired by the ciphertext acquisition unit with the secret key $sk_y$ acquired by the secret key acquisition unit, and calculate an inner-product value of the vector x and the vector y.

Advantageous Effects of Invention

In the present invention, a ciphertext $ct_x$ is generated by encrypting a vector x, using encryption setting information that is of a size depending on the size of the vector x and is generated using as input public information of a fixed size. A secret key $sk_y$ is generated by setting a vector y therein, using key setting information that is of a size depending on the size of the vector y and is generated using as input the public information of the fixed size. Then, the ciphertext $ct_x$ is decrypted with the secret key $sk_y$ to calculate an inner-product value of the vector x and the vector y. Therefore, it is possible to allow construction of an IPFE scheme in which the maximum length of a ciphertext and the maximum length of a secret key are not restricted.

BRIEF DESCRIPTION OF DRAWINGS

FIG. 14 is a configuration diagram of the cryptographic system 1 according to a second embodiment.

DESCRIPTION OF EMBODIMENTS

First Embodiment

*Notations*

Figure 1:
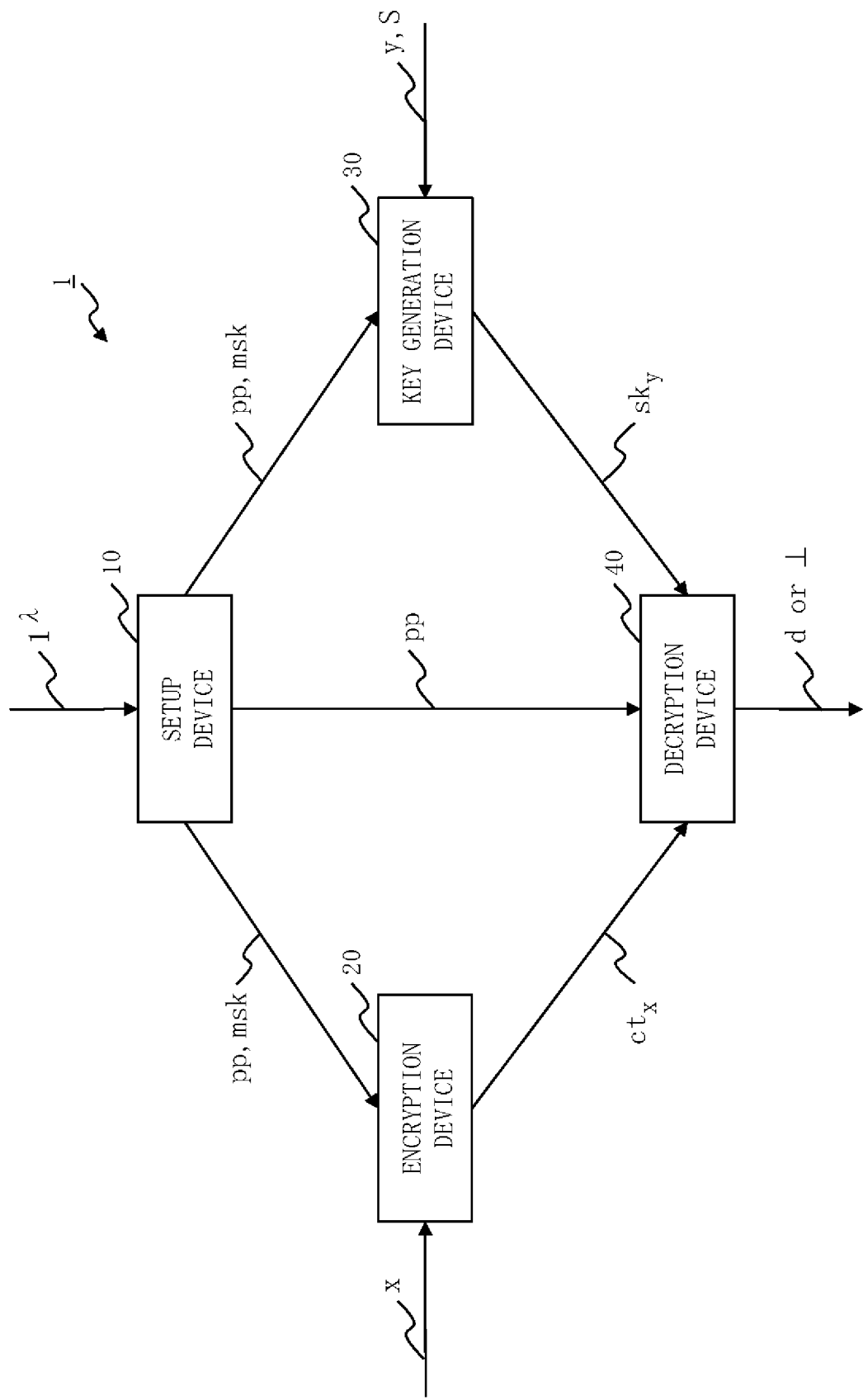
FIG. 1 is a configuration diagram of a cryptographic system 1 according to a first embodiment.

Notations to be used in the following description will be described.

For a prime number p, Formula 101 denotes a field indicated in Formula 102.

$$\mathbb{Z}_p \qquad \text{[Formula 101]}$$

$$\mathbb{Z}/p\mathbb{Z} \qquad \text{[Formula 102]}$$

For natural numbers n and m, [n] denotes a set $\{1, \ldots, n\}$ and [m,n] denotes a set $\{m, \ldots, n\}$.

For a set S, Formula 103 indicates that s is uniformly selected from S.

$$s \xleftarrow{U} S \qquad \text{[Formula 103]}$$

A vector is treated as a row vector. For a vector x, Formula 104 denotes an infinity norm.

$$\|x\|_\infty \qquad \text{[Formula 104]}$$

For a field K, $M_n(K)$ denotes a set of all n×n matrices having elements in K, and $GL_n(K)$ denotes a set of all n×n regular matrices having elements in K.

For a regular matrix A, $A^*$ denotes $(A^{-1})^T$, that is, an adjoint matrix.

For a generator $g_\iota$ of a cyclic group $G_\iota$, a matrix A, and a vector a, $[A]_\iota$ and $[a]_\iota$ denote a matrix and a vector in the exponent part of the generator $g_\iota$, respectively. That is, $[A]_\iota$ denotes $g_\iota^A$ and $[a]_\iota$ denotes $g_\iota^a$.

For a vector x and a vector y indicated in Formula 105, Formula 106 indicates a function that calculates an inner product of the exponent parts by Formula 107.

$$x := (x_1, \ldots, x_n) \in \mathbb{Z}_p^n,$$

$$y := (y_1, \ldots, y_n) \in \mathbb{Z}_p^n \qquad \text{[Formula 105]}$$

$$e([x]_1, [y]_2) := e(g_1, g_2)^{\langle x,y \rangle} \qquad \text{[Formula 106]}$$

$$\prod_{i \in [n]} e([x_i]_1, [y_i]_2) \qquad \text{[Formula 107]}$$

Definitions

Definitions of terms to be used in the following description will be described.

<IPFE>

IPFE is a scheme in which an owner of a master secret key msk can issue a secret key $sk_y$ for a vector y, and when a ciphertext $ct_x$ of a vector x is decrypted with the secret key $sk_y$, only an inner-product value of the vector x and the vector y is revealed.

The calculation of an inner-product value allows various applications such as weighting of numerical data and use for statistical calculations.

<Bilinear Groups>

Bilinear groups $G := (p, G_1, G_2, G_T, g_1, g_2, e)$ include a prime number p, cyclic groups $G_1$, $G_2$, and $G_T$ of order p, a generator $g_1$ of the cyclic group $G_1$, a generator $g_2$ of the cyclic additive group $G_2$, and a bilinear map e indicated in Formula 108, and have two properties, bilinearity and non-degeneracy, as described below.

$$e: G_1 \times G_2 \to G_T \qquad \text{[Formula 108]}$$

(Bilinearity)
Formula 109 holds true.

$$\forall h_1 \in G_1, h_2 \in G_2, a, b \in \mathbb{Z}_p, e(h_1^a, h_2^b) = e(h_1, h_2)^{ab} \qquad \text{[Formula 109]}$$

(Non-Degeneracy)
For the generators $g_1$ and $g_2$, $e(g_1, g_2)$ is a generator of $G_T$.

<Dual Pairing Vector Spaces (Hereinafter DPVS)>

For a natural number n, dual orthonormal bases (B, B*) can be randomly selected, as indicated in Formula 110.

$$B \xleftarrow{U} GL_n(\mathbb{Z}_p),$$

$$B^* := (B^{-1})^T \qquad \text{[Formula 110]}$$

$[B]_1$ and $[B^*]_2$ are dual orthonormal bases of vector spaces $V := G_1^n$ and $V^* := G_2^n$, respectively.

The following two properties hold true.

(Property 1)
For any vectors x and y indicated in Formula 111, Formula 112 holds true.

$$x, y \in \mathbb{Z}_p^n \qquad \text{[Formula 111]}$$

$$e([xB]_1, [yB^*]_2) = e(g_1, g_2)^{\langle x,y \rangle} \qquad \text{[Formula 112]}$$

(Property 2)
For any vectors $x_1, \ldots, x_k$, vectors $y_1, \ldots, y_L$, and matrix M indicated in Formula 113, Formula 114 is uniformly distributed.

$$x_1, \ldots, x_k, y_1, \ldots, y_L \in \mathbb{Z}_p^n,$$

$$M \in GL_n(\mathbb{Z}_p) \qquad \text{[Formula 113]}$$

$$(\{x_i B\}_{i \in [k]}, \{y_i B^*\}_{i \in [L]}),$$

$$(\{x_i MB\}_{i \in [k]}, \{y_i M^* B^*\}_{i \in [L]}) \qquad \text{[Formula 114]}$$

Furthermore, for any set S indicated in Formula 115, Formula 116 is uniformly distributed.

$$S \subseteq [n] \text{ s.t. } \forall i \in S, b_i = M^{-1} b_i \qquad \text{[Formula 115]}$$

$$(\{b_i\}_{i \in S}, \{x_i B\}_{i \in [k]}, \{y_i B^*\}_{i \in [L]}),$$

$$(\{b_i\}_{i \in S}, \{x_i MB\}_{i \in [k]}, \{y_i M^* B^*\}_{i \in [L]}) \qquad \text{[Formula 116]}$$

This is because Formula 117 is random dual orthonormal bases and also because of Formula 118.

$$(D, D^*) := (M^{-1} B, M^T B^*) \qquad \text{[Formula 117]}$$

$$(\{b_i\}_{i \in S}, \{x_i B\}_{i \in [k]}, \{y_i B^*\}_{i \in [L]}) = (\{d_i\}_{i \in S}, \{x_i MD\}_{i \in [k]}, \{y_i M^* D^*\}_{i \in [L]}) \qquad \text{[Formula 118]}$$

<Conditions for Encryption Scheme>

Conditions for encryption, key generation, and decryption will be described.

For encryption and key generation, there are two conditions: continued (con) and separate (sep).

In a continued setting, when a vector is input to an encryption or key generation algorithm, an index is automatically set for each element of the vector depending on its position. That is, for a vector (a, b, c), the index of a is set to 1, the index of b is set to 2, and the index of c is set to 3.

In a separate setting, an index set is added to a vector, and encryption and key generation are performed in correspondence to the index set. In other words, for a vector (a, b, c), induces are set by a certain set, for example, {1, 5, 6}. That is, the index of a is set to 1, the index of b is set to 5, and the index of c is set to 6.

For decryption, there are three conditions: a ct-dominant method, a sk-dominant method, and an equal method.

Let $S_{ct}$ be an index set for a ciphertext ct, and let $S_{sk}$ be an index set for a secret key sk. In this case, in the ct-dominant method, the ciphertext ct is decrypted with the secret key sk only if $S_{ct} \supseteq S_{sk}$. In the sk-dominant method, the ciphertext ct is decrypted with the secret key sk only if $S_{ct} \subseteq S_{sk}$. In the equal method, the ciphertext ct is decrypted with the secret key sk only if $S_{ct}=S_{sk}$.

In the following description, the conditions of the scheme will be denoted as (E:xx, K:yy, D:zz). In each of "xx" and "yy", one of "con" representing the continued setting and "sep" representing the separate setting is set. In "zz", one of "ct-dom" representing the ct-dominant method, "sk-dom" representing the sk-dominant method, and "eq" representing the equal method is set.

In a first embodiment, a (E:con, K:sep, D:ct-dom) setting will be described. That is, in the first embodiment, a scheme will be described in which for a ciphertext of a vector of a length m and a secret key to which a set S is added, the ciphertext can be decrypted with the secret key and an inner-product value concerning the set S can be obtained only if $S \subseteq [m]$. However, as will be described in another embodiment later, other settings can also be realized.

<Norm Upper Limits>

An unbounded IPFE (hereinafter UIPFE) scheme to be described in the first embodiment includes a process to solve a discrete logarithm problem during decryption. Therefore, upper limits are placed on norms of vectors to be handled. The upper limits are placed on the norms of vectors to be handled by defining a function used in the IPFE scheme as described below.

A function family F is composed of functions $f_{S,y}^{X,Y}$ indicated in Formula 119.

$$f_{S,y}^{X,Y}: \mathbb{Z}^m \to \mathbb{Z} \qquad \text{[Formula 119]}$$

where $$X, Y \in \mathbb{N}, S \subset \mathbb{N},$$

$$y:=(y_i)_{i \in S} \in \mathbb{Z}^S \text{ s.t. } \|y\|_\infty \leq Y,$$

$$m \in \mathbb{N} \text{ s.t. } S \subseteq [m]$$

For all vectors x indicated in Formula 120, a function indicated in Formula 121 is defined.

$$x := (x_1, \ldots, x_m) \in \mathbb{Z}^m \text{ s.t. } \|x\|_\infty \leq X \qquad \text{[Formula 120]}$$

$$f_{S,y}^{X,Y}(x) := \sum_{i \in S} x_i y_i \qquad \text{[Formula 121]}$$

*Description of Configurations*

<Construction of Private-Key UIPFE>

In the first embodiment, private-key UIPFE will be described. The private-key UIPFE is UIPFE with a secret key setting. The secret key setting is a scheme in which a secret key is required to create a ciphertext.

For the encryption scheme with the secret key setting, there is a practical application such as a case in which the same user performs encryption and decryption when, for example, backup data of a terminal is placed in a cloud and the backup data is acquired from the cloud when necessary.

The private-key UIPFE includes a Setup algorithm, an Enc algorithm, a KeyGen algorithm, and a Dec algorithm. Let $X:=\{X_\lambda\}_{\lambda \in N}$ and $Y:=\{Y_\lambda\}_{\lambda \in N}$ be ensembles of norm upper limits, where N is a set of natural numbers.

The Setup algorithm takes as input a security parameter $1^\lambda$, and outputs a public parameter pp and a master secret key msk.

The Enc algorithm takes as input the public parameter pp, the master secret key msk, and a vector $x:=(x_1, \ldots, x_m)$, and outputs a ciphertext $ct_x$. Note that $m:=m(\lambda)$ is a polynomial.

The KeyGen algorithm takes as input the public parameter pp, the master secret key msk, a non-empty set $S:=[s]$, and an indexed vector $y:=(y_i)_{i \in S}$, and outputs a secret key $sk_y$. Note that $s:=s(\lambda)$ is a polynomial.

The Dec algorithm takes as input the public parameter pp, the ciphertext $ct_x$, and the secret key $sk_y$, and outputs a decrypted value $d \in Z$ or outputs an identifier $\perp$. Note that Z is a set of integers. The identifier $\perp$ indicates that decryption is not possible.

<Configuration of Cryptographic System 1>

Referring to FIG. 1, a configuration of a cryptographic system 1 according to the first embodiment will be described.

The cryptographic system 1 includes a setup device 10, an encryption device 20, a key generation device 30, and a decryption device 40. The setup device 10, the encryption device 20, the key generation device 30, and the decryption device 40 are connected via a network.

Figure 2:
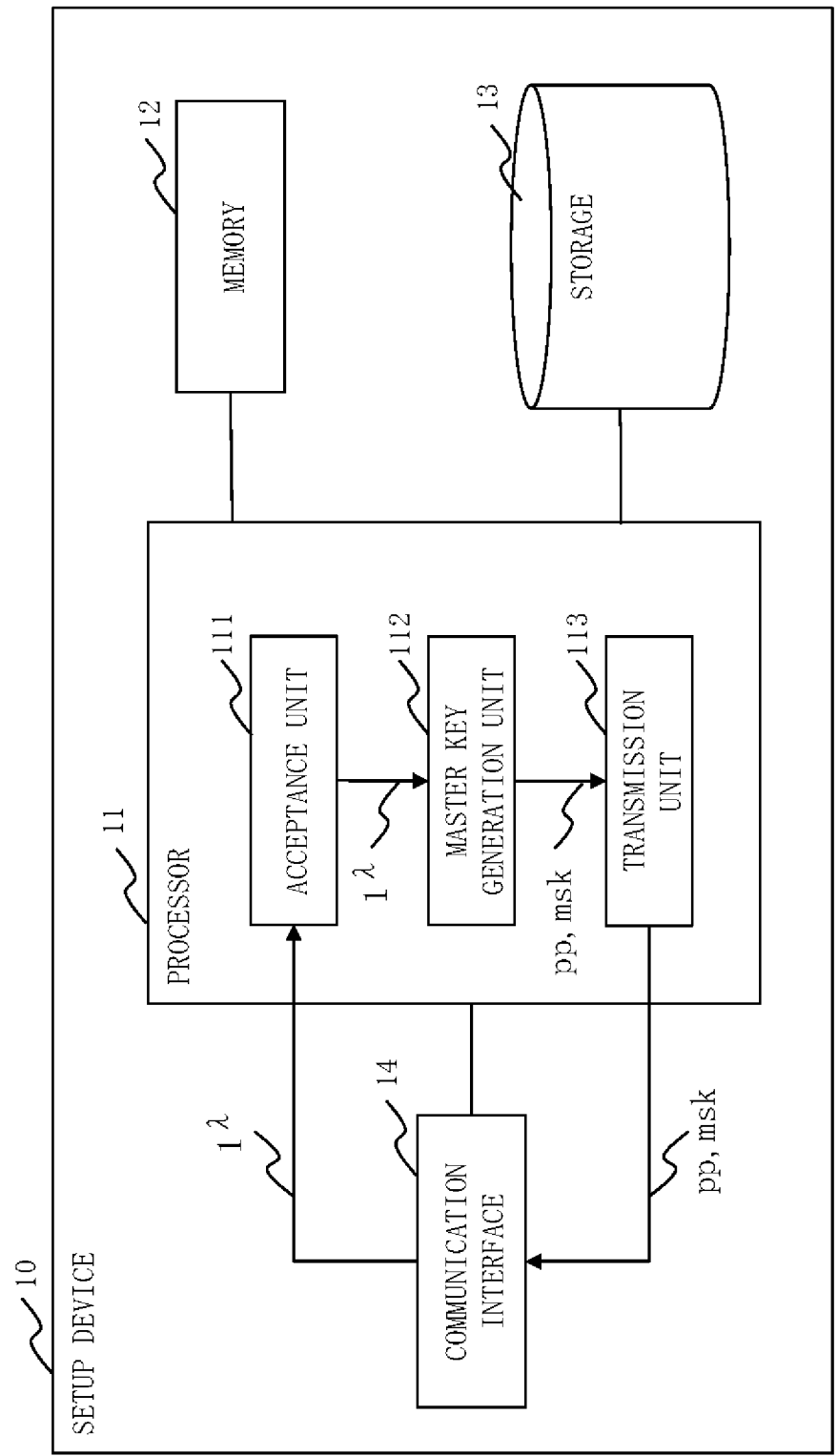
FIG. 2 is a configuration diagram of a setup device 10 according to the first embodiment.

Referring to FIG. 2, a configuration of the setup device 10 according to the first embodiment will be described.

The setup device 10 is a computer that executes the Setup algorithm.

The setup device 10 includes hardware of a processor 11, a memory 12, a storage 13, and a communication interface 14. The processor 11 is connected with the other hardware components via signal lines and controls the other hardware components.

The setup device 10 includes, as functional components, an acceptance unit 111, a master key generation unit 112, and a transmission unit 113. The functions of the functional components of the setup device 10 are realized by software.

The storage 13 stores programs for realizing the functions of the functional components of the setup device 10. These programs are loaded into the memory 12 by the processor 11 and executed by the processor 11. This realizes the functions of the functional components of the setup device 10.

Figure 3:
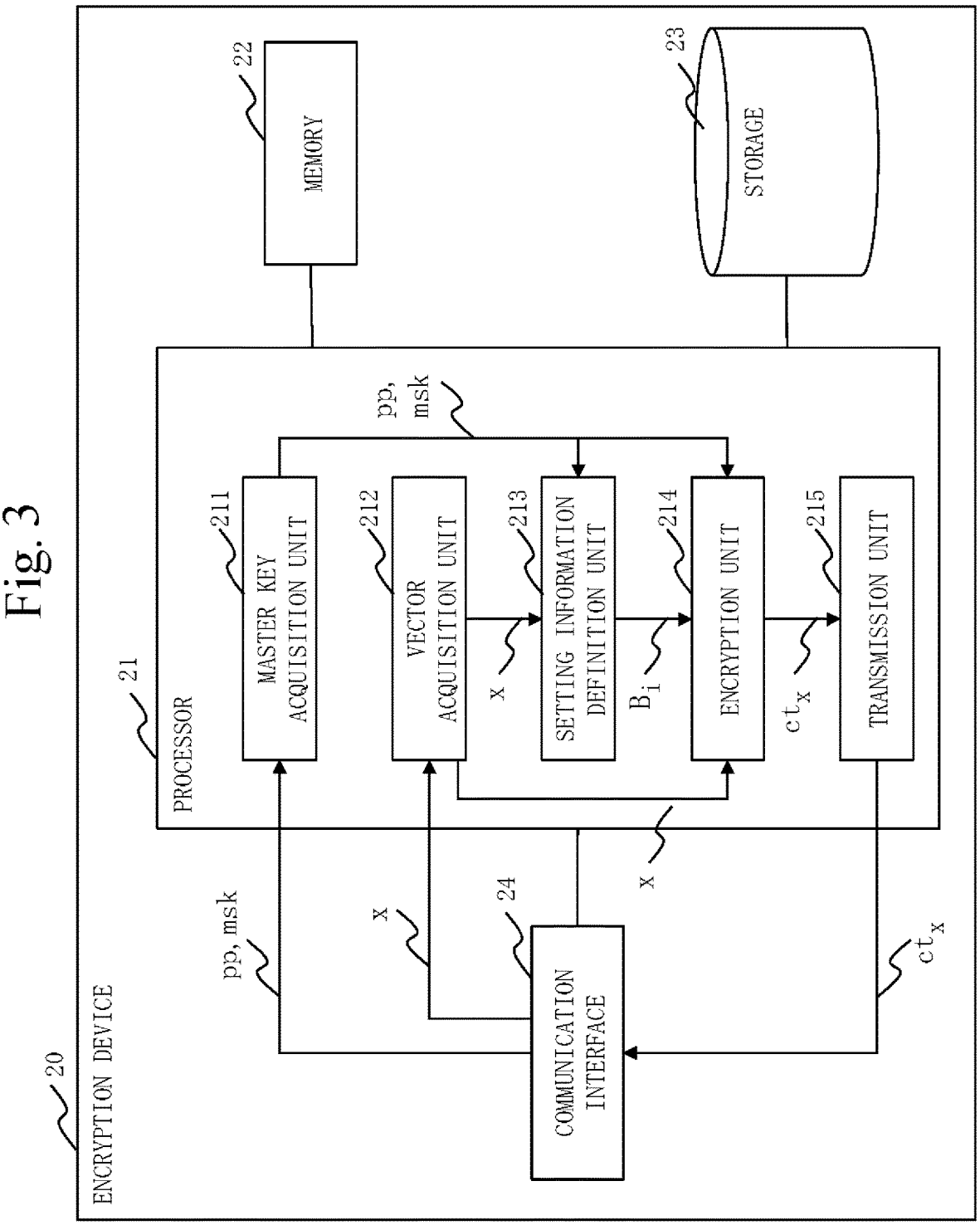
FIG. 3 is a configuration diagram of an encryption device 20 according to the first embodiment.

Referring to FIG. 3, a configuration of the encryption device 20 according to the first embodiment will be described.

The encryption device 20 is a computer that executes the Enc algorithm.

The encryption device 20 includes hardware of a processor 21, a memory 22, a storage 23, and a communication interface 24. The processor 21 is connected with the other hardware components via signal lines and controls the other hardware components.

The encryption device 20 includes, as functional components, a master key acquisition unit 211, a vector acquisition unit 212, a setting information definition unit 213, an encryption unit 214, and a transmission unit 215. The functions of the functional components of the encryption device 20 are realized by software.

The storage 23 stores programs for realizing the functions of the functional components of the encryption device 20. These programs are loaded into the memory 22 by the processor 21 and executed by the processor 21. This realizes the functions of the functional components of the encryption device 20.

Figure 4:
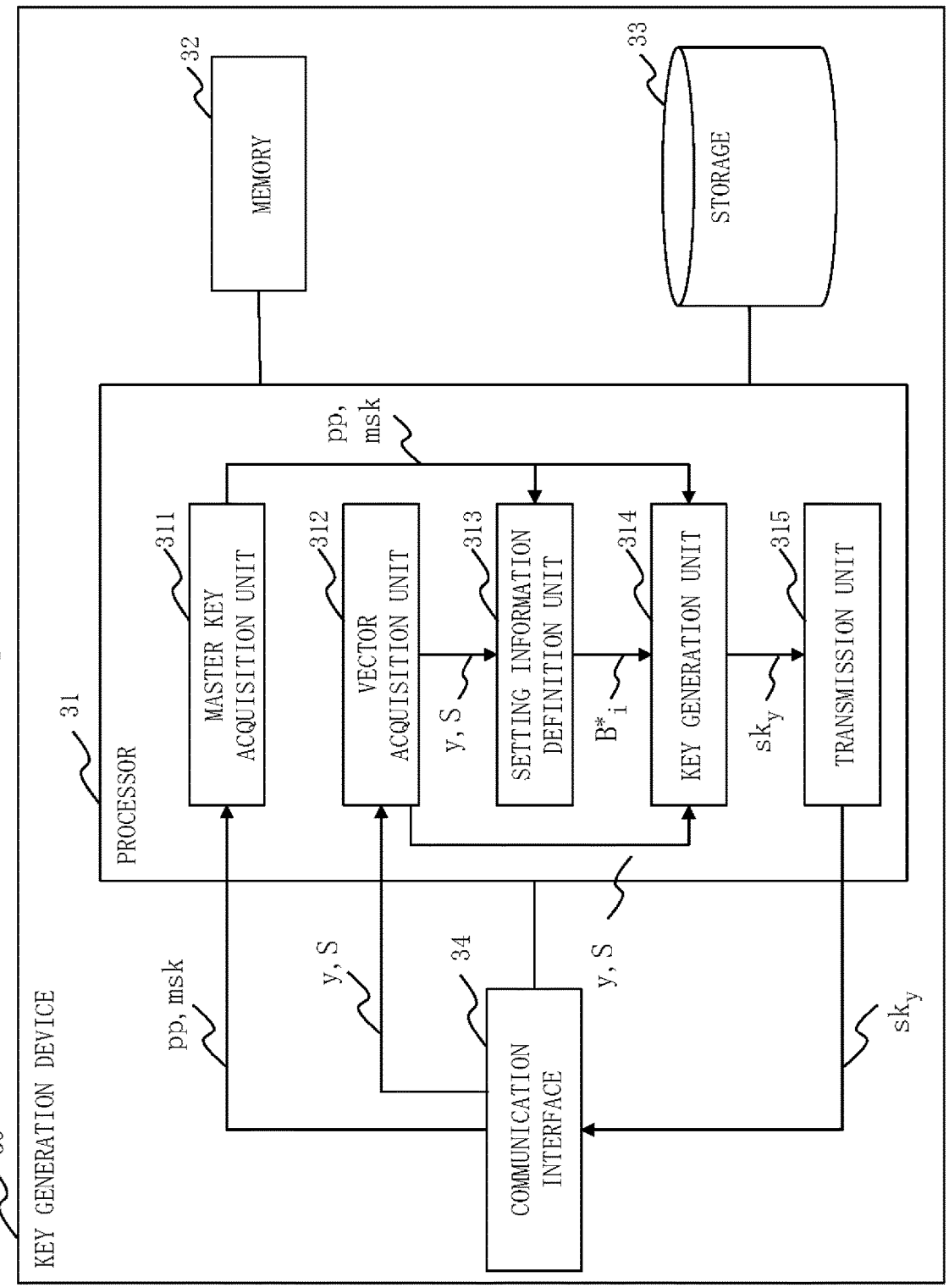
FIG. 4 is a configuration diagram of a key generation device 30 according to the first embodiment.

Referring to FIG. 4, a configuration of the key generation device 30 according to the first embodiment will be described.

The key generation device 30 is a computer that executes the KeyGen algorithm.

The key generation device 30 includes hardware of a processor 31, a memory 32, a storage 33, and a communication interface 34. The processor 31 is connected with the other hardware components via signal lines and controls the other hardware components.

The key generation device 30 includes, as functional components, a master key acquisition unit 311, a vector acquisition unit 312, a setting information definition unit 313, a key generation unit 314, and a transmission unit 315. The functions of the functional components of the key generation device 30 are realized by software.

The storage 33 stores programs for realizing the functions of the functional components of the key generation device 30. These programs are loaded into the memory 32 by the processor 31 and executed by the processor 31. This realizes the functions of the functional components of the key generation device 30.

Figure 5:
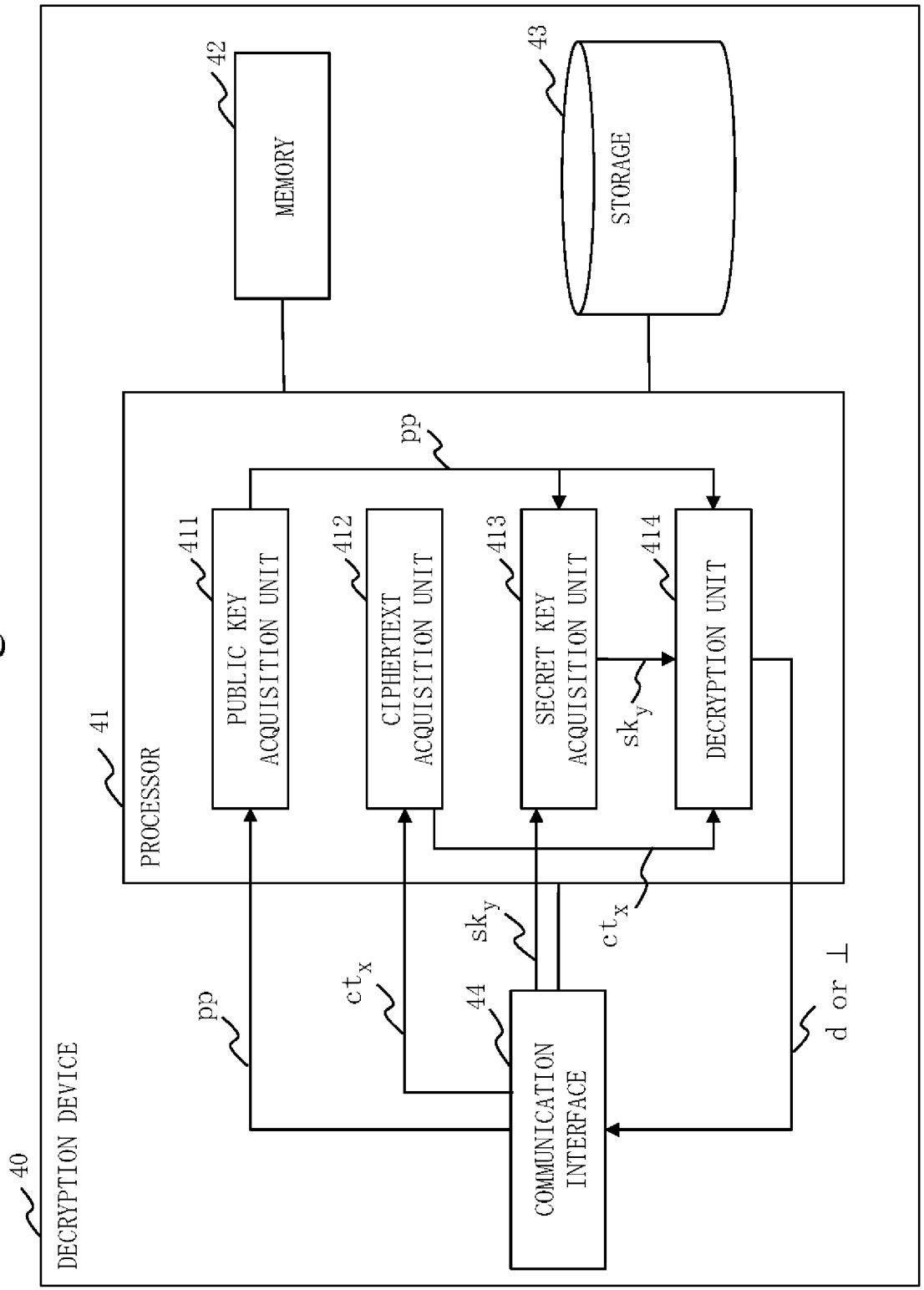
FIG. 5 is a configuration diagram of a decryption device 40 according to the first embodiment.

Referring to FIG. 5, a configuration of the decryption device 40 according to the first embodiment will be described.

The decryption device 40 is a computer that executes the Dec algorithm.

The decryption device 40 includes hardware of a processor 41, a memory 42, a storage 43, and a communication interface 44. The processor 41 is connected with the other hardware components via signal lines and controls the other hardware components.

The decryption device 40 includes, as functional components, a public key acquisition unit 411, a ciphertext acquisition unit 412, a secret key acquisition unit 413, and a decryption unit 414. The functions of the functional components of the decryption device 40 are realized by software.

The storage 43 stores programs for realizing the functions of the functional components of the decryption device 40. These programs are loaded into the memory 42 by the processor 41 and executed by the processor 41. This realizes the functions of the functional components of the decryption device 40.

Each of the processors 11, 21, 31, and 41 is an integrated circuit (IC) that performs processing. As a specific example, each of the processors 11, 21, 31, and 41 is a central processing unit (CPU), a digital signal processor (DSP), or a graphics processing unit (GPU).

Each of the memories 12, 22, 32, and 42 is a storage device to temporarily store data. As a specific example, each of the memories 12, 22, 32, and 42 is a static random access memory (SRAM) or a dynamic random access memory (DRAM).

Each of the storages 13, 23, 33, and 43 is a storage device to store data. As a specific example, each of the storages 13, 23, 33, and 43 is a hard disk drive (HDD). Alternatively, each of the storages 13, 23, 33, and 43 may be a portable recording medium, such as a Secure Digital (SD, registered trademark) memory card, CompactFlash (CF, registered trademark), a NAND flash, a flexible disk, an optical disc, a compact disc, a Blu-ray (registered trademark) disc, or a digital versatile disk (DVD).

Each of the communication interfaces 14, 24, 34, and 44 is an interface for communicating with external devices. As a specific example, each of the communication interfaces 14, 24, 34, and 44 is an Ethernet (registered trademark) port, a Universal Serial Bus (USB) port, or a High-Definition Multimedia Interface (HDMI, registered trademark) port.

FIG. 2 illustrates only one processor 11. However, a plurality of processors 11 may be included, and the plurality of processors 11 may cooperate to execute the programs for realizing the functions. Similarly, a plurality of processors 21, a plurality of processors 31, and a plurality of processors 41 may be included, and the plurality of processors 21 may cooperate, the plurality of processors 31 may cooperate, and the plurality of processors 41 may cooperate to execute the programs for realizing the respective functions.

\*\*\*Description of Operation\*\*\*

In the following description, norm upper limits $X_\lambda$ and $Y_\lambda$ are certain polynomials. A function family F indicated in Formula 122 is a pseudorandom function (hereinafter PRF) family that concerns a key space $K_\lambda$ and is composed of a function $F_K$ indicated in Formula 123.

$$\mathcal{F} := \{F_K\}_{K \in \mathcal{K}_\lambda} \quad \text{[Formula 122]}$$

$$F_K : \{0,1\}^\lambda \to M_4(\mathbb{Z}_p) \quad \text{[Formula 123]}$$

Figure 6:
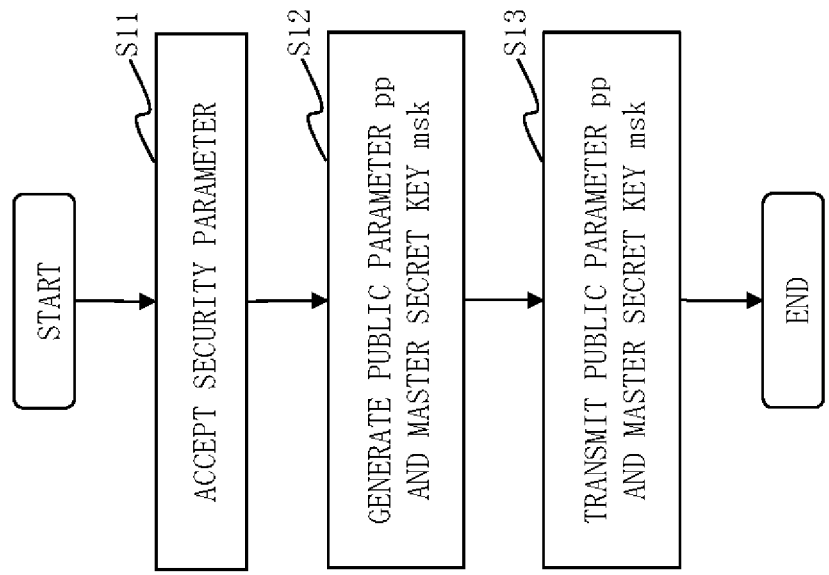
FIG. 6 is a flowchart illustrating operation of the setup device 10 according to the first embodiment.

Referring to FIG. 6, operation of the setup device 10 according to the first embodiment will be described.

The operation of the setup device 10 according to the first embodiment corresponds to a setup method according to the first embodiment. The operation of the setup device 10 according to the first embodiment also corresponds to processes of a setup program according to the first embodiment.

(Step S11: Acceptance Process)

The acceptance unit 111 accepts input of a security parameter $1^\lambda$.

Specifically, the acceptance unit 111 accepts, via the communication interface 14, the security parameter $1^\lambda$ input by a user of the setup device 10. The acceptance unit 111 writes the security parameter $1^\lambda$ in the memory 12.

(Step S12: Master Key Generation Process)

The master key generation unit 112 selects a bilinear group G, using as input the security parameter $1^\lambda$ accepted in step S11. The master key generation unit 112 randomly selects a PRF key K from a key space $K_\lambda$.

Specifically, the master key generation unit 112 retrieves the security parameter $1^\lambda$ from the memory 12. The master key generation unit 112 executes a bilinear group generation algorithm $G_{BG}$ to select the bilinear group G, using as input the security parameter $1^\lambda$. The master key generation unit 112 randomly selects the PRF key K from the key space $K_\lambda$ determined by the security parameter $1^\lambda$. The master key generation unit 112 writes the bilinear group G and the PRF key K in the memory 12.

(Step S13: Transmission Process)

The transmission unit 113 publishes the bilinear group G selected in step S12 as a public parameter pp. Specifically, the transmission unit 113 retrieves the bilinear group G from the memory 12. The transmission unit 113 publishes the bilinear group G as the public parameter pp by a method such as transmitting it to a server for publication. This allows the encryption device 20, the key generation device 30, and the decryption device 40 to acquire the bilinear group G.

The transmission unit 113 transmits the PRF key K selected in step S12 as a master secret key msk to the encryption device 20 and the key generation device 30 in secrecy. Specifically, the transmission unit 113 retrieves the PRF key K from the memory 12. The transmission unit 113 encrypts the PRF key K with an existing encryption scheme, and then transmits the PRF key K as the master secret key msk to the encryption device 20 and the key generation device 30.

That is, the setup device 10 executes the Setup algorithm as indicated in Formula 124.

$$\text{Setup}(1^\lambda): \quad \text{[Formula 124]}$$

$$G \leftarrow G_{BG}(1^\lambda), K \xleftarrow{U} \mathcal{K}_\lambda,$$

-continued $$pp := \mathbb{G}, msk := K.$$

Figure 7:
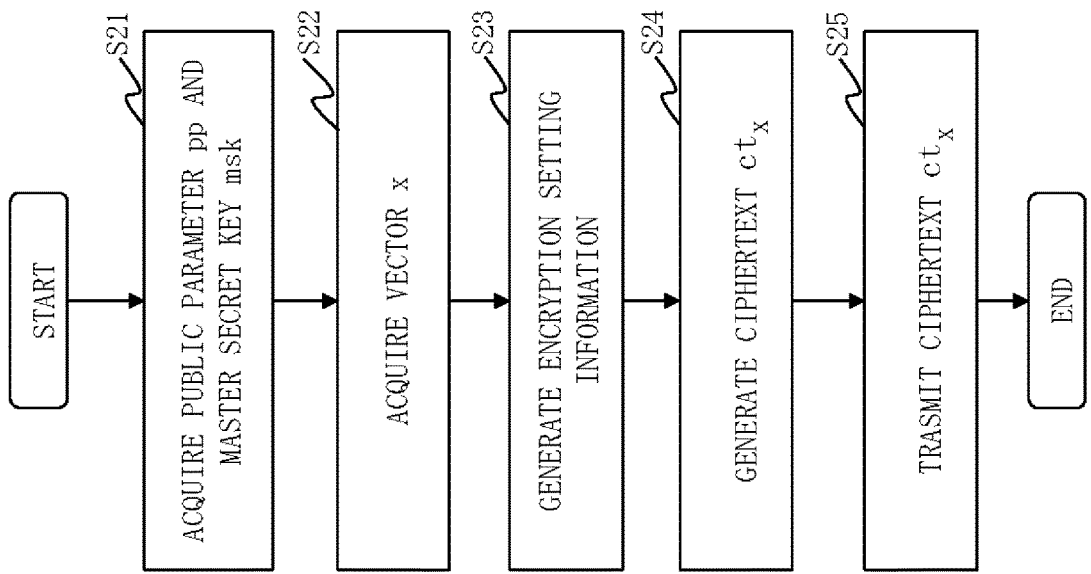
FIG. 7 is a flowchart illustrating operation of the encryption device 20 according to the first embodiment.

Referring to FIG. 7, operation of the encryption device 20 according to the first embodiment will be described.

The operation of the encryption device 20 according to the first embodiment corresponds to an encryption method according to the first embodiment. The operation of the encryption device 20 according to the first embodiment also corresponds to processes of an encryption program according to the first embodiment.

(Step S21: Master Key Acquisition Process)

The master key acquisition unit 211 acquires the bilinear group G, which is the public parameter pp, and the PRF key K, which is the master secret key msk, generated by the setup device 10.

Specifically, the master key acquisition unit 211 acquires the published parameter pp and acquires the master secret key msk transmitted by the setup device 10, via the communication interface 24. The master key acquisition unit 211 writes the public parameter pp and the master secret key msk in the memory 22.

(Step S22: Vector Acquisition Process)

The vector acquisition unit 212 acquires a vector x indicated in Formula 125. The vector x is to be encrypted. Note here that m:=m(λ) is a polynomial.

$$x:=(x_1, \ldots, x_m) \in \mathbb{Z}^m \qquad \text{[Formula 125]}$$

Specifically, the vector acquisition unit 212 acquires, via the communication interface 24, the vector x input by a user of the encryption device 20. The vector acquisition unit 212 writes the vector x in the memory 22.

(Step S23: Setting Information Generation Process)

The setting information definition unit 213 defines encryption setting information of a size depending on the size of the vector x to be encrypted that is acquired in step S22, using as input the master secret key msk, which is public information of a fixed size, acquired in step S21. Based on the public information of the fixed size, the setting information definition unit 213 encrypts information for expanding a data size depending on the size of the vector x, and generates the encryption setting information in which the information for expanding the data size is set. The information for expanding the data size here is an index i. Therefore, the setting information definition unit 213 encrypts the index i and generates the encryption setting information in which the index i is set.

Specifically, the setting information definition unit 213 retrieves the master secret key msk and the vector x from the memory 22. The setting information definition unit 213 inputs the PRF key K, which is the master secret key msk, and the index i to a function F, which is a PRF and generates a matrix $B_i$ as the encryption setting information, for each integer i of i=1, . . . , m, where m is the number of elements in the vector x. That is, the setting information definition unit 213 calculates $B_i:=F_K(i)$ and treats the matrix $B_i$ as the encryption setting information, for each integer i of i=1, . . . , m.

Note that when the generated matrix $B_i$ is a singular matrix, the setting information definition unit 213 outputs the identifier ⊥ and ends the process.

(Step S24: Encryption Process)

The encryption unit 214 encrypts the vector x to generate a ciphertext $ct_x$, using the encryption setting information defined in step S23.

Specifically, the encryption unit 214 calculates an element $c_i$, as indicated in Formula 126, for each integer i of i=1, . . . , m. That is, the encryption unit 214 encrypts the vector x and calculates the element $c_i$, using the encryption setting information in which the index i is encrypted.

$$c_i := (x_i, 0, z, 0)B_i \in \mathbb{Z}_p^4 \qquad \text{[Formula 126]}$$

where $$z \xleftarrow{U} \mathbb{Z}_p$$

The encryption unit 214 retrieves a group element $g_1$ of a group $G_1$ included in the bilinear group G, which is the public parameter pp, from the memory 12. The encryption unit 214 generates an element $[c_i]_1$ which is the group element $g_1$ in whose exponent part each element $c_i$ for each integer i of i=1, . . . , m is set. The encryption unit 214 writes the element $[c_i]_1$ for each integer i of i=1, . . . , m in the memory 22 as a ciphertext $ct_x$, as indicated in Formula 127.

$$ct_x := ([c_1]_1, \ldots, [c_m]_1) \qquad \text{[Formula 127]}$$

(Step S25: Transmission Process)

The transmission unit 215 transmits the ciphertext $ct_x$ generated in step S24 to the decryption device 40. Specifically, the transmission unit 215 retrieves the ciphertext $ct_x$ from the memory 22. The transmission unit 215 transmits the ciphertext $ct_x$ to the decryption device 40 via the communication interface 24.

That is, the encryption device 20 executes the Enc algorithm as indicted in Formula 128.

$$Enc(pp, msk, x := (x_1, \ldots, x_m) \in \mathbb{Z}^m \text{ where } m := \qquad \text{[Formula 128]}$$

$$m(\lambda) \text{ is any polynomial}):$$

$$B_i := F_K(i), c_i := (x_i, 0, z, 0)B_i \in \mathbb{Z}_p^4 \text{ for all } i \in [m],$$

$$\text{where } z \xleftarrow{U} \mathbb{Z}_p,$$

$$ct_x := ([c_1]_1, \ldots, [c_m]_1).$$

Figure 8:
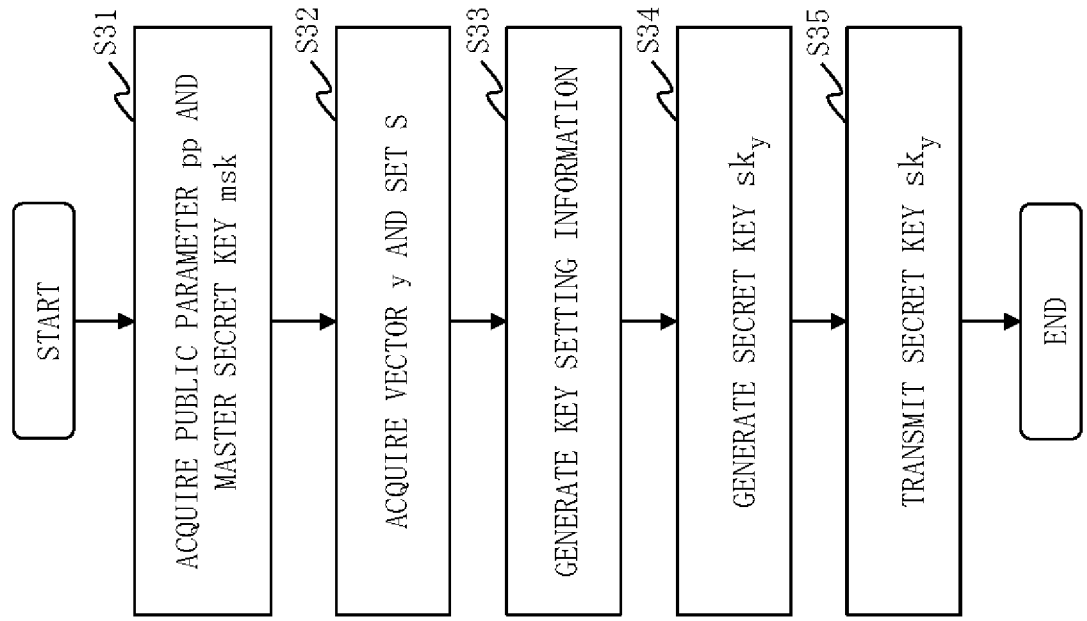
FIG. 8 is a flowchart illustrating operation of the key generation device 30 according to the first embodiment.

Referring to FIG. 8, operation of the key generation device 30 according to the first embodiment will be described.

The operation of the key generation device 30 according to the first embodiment corresponds to a key generation method according to the first embodiment. The operation of the key generation device 30 according to the first embodiment also corresponds to processes of a key generation program according to the first embodiment.

(Step S31: Master Key Acquisition Process)

The master key acquisition unit 311 acquires the bilinear group G, which is the public parameter pp, and the PRF key K, which is the master secret key msk, generated by the setup device 10.

Specifically, the master key acquisition unit 311 acquires the published public parameter pp and acquires the master secret key msk transmitted by the setup device 10, via the communication interface 34. The master key acquisition unit 311 writes the public parameter pp and the master secret key msk in the memory 32.

(Step S32: Vector Acquisition Process)

The vector acquisition unit 312 acquires a set S⊆[s] and a vector y, indicated in Formula 129, in which indices are set. Note that s:=s(λ) is a polynomial.

$$y := (y_i)_{i \in S} \in \mathbb{Z}^s \qquad \text{[Formula 129]}$$

Specifically, the vector acquisition unit 312 acquires, via the communication interface 24, the set S and the vector y that are input by a user of the key generation device 30. The vector acquisition unit 312 writes the set S and the vector y in the memory 32.

(Step S33: Setting Information Generation Process)

The setting information definition unit 313 defines key setting information of a size depending on the size of the vector y acquired in step S32, using as input the master secret key msk, which is the public information of the fixed size, acquired in step S31. Based on the public information of the fixed size, the setting information definition unit 313 encrypts information for expanding the data size depending on the size of the vector y, and generates the key setting information in which the information for expanding the data size is set. The information for expanding the data size here is the index i. Therefore, the setting information definition unit 313 encrypts the index i, and generates the key setting information in which the index i is set.

Specifically, the setting information definition unit 313 retrieves the master secret key msk and the set S from the memory 32. The setting information definition unit 313 inputs the PRF key K, which is the master secret key msk, and the index i to the function F, which is a PRF, and generates a matrix $B_i$, for each integer i of i∈S. The setting information definition unit 313 generates an adjoint matrix $B^*_i := (B_i^{-1})^T$ of the matrix $B_i$ as the key setting information. That is, the setting information definition unit 313 calculates $B_i := F_K(i)$ and treats the adjoint matrix $B^*_i$ of the matrix $B_i$ as the key setting information, for each integer i of i∈S.

Note that when the generated matrix $B_i$ is a singular matrix, the setting information definition unit 313 outputs the identifier ⊥ and ends the process.

(Step S34: Key Generation Process)

The key generation unit 314 generates a secret key $sk_y$ in which the vector y is set, using the key setting information generated in step S33.

Specifically, the key generation unit 314 generates a random number $r_i$, as indicated in Formula 130, for each integer i of i∈S.

$$r_i \xleftarrow{U} \mathbb{Z}_p \text{ s.t. } \sum_{i \in S} r_i = 0 \qquad \text{[Formula 130]}$$

The key generation unit 314 generates an element $k_i$ using the random number $r_i$, as indicated in Formula 131, for each integer i of i∈S. That is, the key generation unit 314 encrypts the vector y and calculates the element $k_i$, using the key setting information in which the index i is encrypted.

$$k_i := (y_i, 0, r_i, 0) B^*_i \in \mathbb{Z}_p^4 \qquad \text{[Formula 131]}$$

The key generation unit 314 retrieves a group element $g_2$ of a group $G_2$ included in the bilinear group G, which is the public parameter pp, from the memory 12. The key generation unit 314 generates an element $[k_i]_2$ which is the group element $g_2$ in whose exponent part each element $k_i$ is set, for each integer i of i∈S. The key generation unit 314 writes the set S and the element $[k_i]_2$ for each integer i of i∈S as the secret key $sk_y$ in the memory 32, as indicated in Formula 132.

$$sk_y := (S, \{[k_i]_2\}_{i \in S}) \qquad \text{[Formula 132]}$$

(Step S35: Transmission Process)

The transmission unit 315 transmits the secret key $sk_y$ generated in step S34 to the decryption device 40. Specifically, the transmission unit 315 retrieves the secret key $sk_y$ from the memory 32. The transmission unit 315 transmits the secret key $sk_y$ to the decryption device 40 via the communication interface 34.

That is, the key generation device 30 executes the KeyGen algorithm as indicated in Formula 133.

$$KeyGen(pp, msk, S \subseteq [s] \text{ where } s := \qquad \text{[Formula 133]}$$
$$s(\lambda) \text{ is any polynomial}, y := (y_i)_{i \in S} \in \mathbb{Z}^S):$$
$$\{r_i\}_{i \in S} \xleftarrow{U} \mathbb{Z}_p \text{ s.t. } \sum_{i \in S} r_i = 0,$$
$$B_i := F_K(i),$$
$$k_i := (y_i, 0, r_i, 0) B^*_i \in \mathbb{Z}_p^4 \text{ for all } i \in S,$$
$$sk_y := (S, \{[k_i]_2\}_{i \in S}).$$

Figure 9:
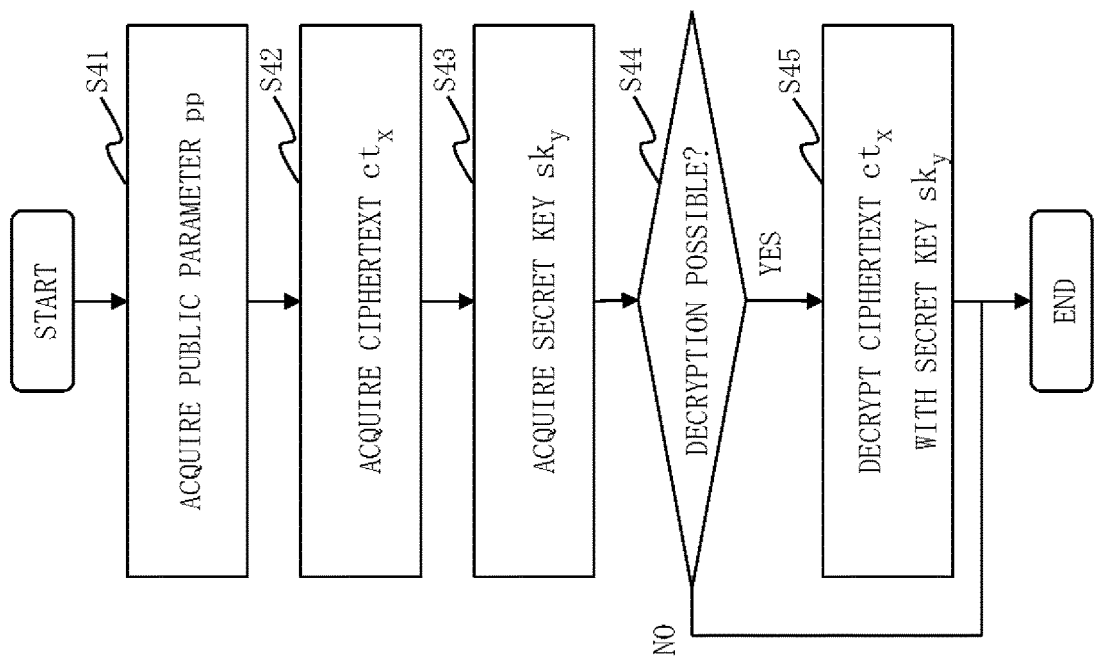
FIG. 9 is a flowchart illustrating operation of the decryption device 40 according to the first embodiment.

Referring to FIG. 9, operation of the decryption device 40 according to the first embodiment will be described.

The operation of the decryption device 40 according to the first embodiment corresponds to a decryption method according to the first embodiment. The operation of the decryption device 40 according to the first embodiment also corresponds to processes of a decryption program according to the first embodiment.

(Step S41: Public Key Acquisition Process)

The public key acquisition unit 411 acquires the bilinear group G, which is the public parameter pp, generated by the setup device 10.

Specifically, the public key acquisition unit 411 acquires the published public parameter pp via the communication interface 44. The public key acquisition unit 411 writes the public parameter pp in the memory 42.

(Step S42: Ciphertext Acquisition Process)

The ciphertext acquisition unit 412 acquires the ciphertext $ct_x$ generated by the encryption device 20.

Specifically, the ciphertext acquisition unit 412 acquires, via the communication interface 44, the ciphertext $ct_x$ transmitted by the encryption device 20. The ciphertext acquisition unit 412 writes the ciphertext $ct_x$ in the memory 42.

(Step S43: Secret Key Acquisition Process)

The secret key acquisition unit 413 acquires the secret key $sk_y$ generated by the key generation device 30.

Specifically, the secret key acquisition unit 413 acquires, via the communication interface 44, the secret key $sk_y$ transmitted by the key generation device 30. The secret key acquisition unit 413 writes the secret key $sk_y$ in the memory 42.

(Step S44: Determination Process)

The decryption unit 414 determines whether S⊆[m] holds true to determine whether or not decryption is possible.

If S⊆[m] holds true, the decryption unit 414 advances the process to step S45. If S⊆[m] does not hold true, the decryption unit 414 determines that decryption is not possible, and thus outputs the identifier ⊥ and ends the process.

(Step S45: Decryption Process)

The decryption unit 414 decrypts the ciphertext $ct_x$ acquired in step S42 with the secret key $sk_y$ acquired in step S43 to calculate an inner-product value of the vector x and the vector y.

Specifically, the decryption unit 414 retrieves the public parameter pp, the ciphertext $ct_x$, and the secret key $sk_y$ from the memory 42. The decryption unit 414 calculates a value h by calculating a pairing operation on the ciphertext $ct_x$ and the secret key $sk_y$, as indicated in Formula 134.

$$h := \prod_{i \in S} e([c_i]_1, [k_i]_2) \qquad \text{[Formula 134]}$$

The decryption unit 414 searches for a value d such that $e(g_1, g_2)^d = h$ holds true from a range of $-|S|X_\lambda Y_\lambda$ to $|S|X_\lambda Y_\lambda$, where $|S|$ is the number of elements in the set S. If the value d is found, the decryption unit 414 outputs the value d. If the value d is not found, the decryption unit 414 outputs the identifier $\perp$.

The value h is calculated as indicated in Formula 135.

$$\begin{aligned} h &:= \prod_{i \in S} e([c_i]_1, [k_i]_2) \qquad \text{[Formula 135]} \\ &= e(g_1, g_2)^{\sum_{i \in S} \langle c_i, k_i \rangle} \\ &= e(g_1, g_2)^{\sum_{i \in S} (x_i y_i + z r_i)} \\ &= e(g_1, g_2)^{\sum_{i \in S} x_i y_i} \end{aligned}$$

Therefore, the value d such that $e(g_1, g_2)^d = h$ holds true is the inner-product value of the vector x and the vector y.

That is, the decryption device 40 executes the Dec algorithm as indicated in Formula 136.

$$\begin{aligned} &Dec(pp, ct_x, sk_y): \qquad \text{[Formula 136]} \\ &\text{If } S = [m], \\ &h := \prod_{i \in S} e([c_i]_1, [k_i]_2), \\ &\text{searches for } d \text{ s.t. } e(g_1, g_2)^d = h \\ &\text{exhaustively in the range of} \\ &-|S|X_\lambda Y_\lambda \text{ to } |S|X_\lambda Y_\lambda, \\ &\text{If such } d \text{ is found, outputs } d. \\ &\text{Otherwise, outputs } \perp. \end{aligned}$$

\*\*\*Effects of First Embodiment\*\*\*

As described above, in the cryptographic system 1 according to the first embodiment, a ciphertext $ct_x$ is generated by encrypting a vector x, using encryption setting information that is of a size depending on the size of the vector x and is generated using as input public information of a fixed size. A secret key $sk_y$ is generated by setting a vector y therein, using key setting information that is of a size depending on the size of the vector y and is generated using as input the public information of the fixed size. Then, the ciphertext $ct_x$ is decrypted with the secret key $sk_y$ to calculate an inner-product value of the vector x and the vector y. Therefore, it is possible to allow construction of an IPFE scheme in which the maximum length of a ciphertext and the maximum length of a secret key are not restricted.

The encryption setting information and the key setting information are generated by the PRF, using as input the public information. This allows the encryption setting information and the key setting information to be generated randomly from the public information of the fixed size.

The random number z is included in the element $c_i$ constituting each element $[c_i]_1$ of the ciphertext $ct_x$. This prevents some elements of the ciphertext $ct_x$ from being replaced with elements of another ciphertext generated separately. That is, the ciphertext $ct_x$ is bound by the random number z.

Similarly, the random number $r_i$ is included in the element $k_i$ constituting each element $[k_i]_2$ of the secret key $sk_y$. This prevents some elements of the secret key $sk_y$ from being replaced with elements of another secret key generated separately or prevents some elements of the secret key $sk_y$ from being deleted. That is, the secret key $sk_y$ is bound by the random number $r_i$.

\*\*\*Other Configurations\*\*\*

<First Variation>

In the first embodiment, the functional components are realized by software. As a first variation, however, the functional components may be realized by hardware. With regard to this first variation, differences from the first embodiment will be described.

Figure 10:
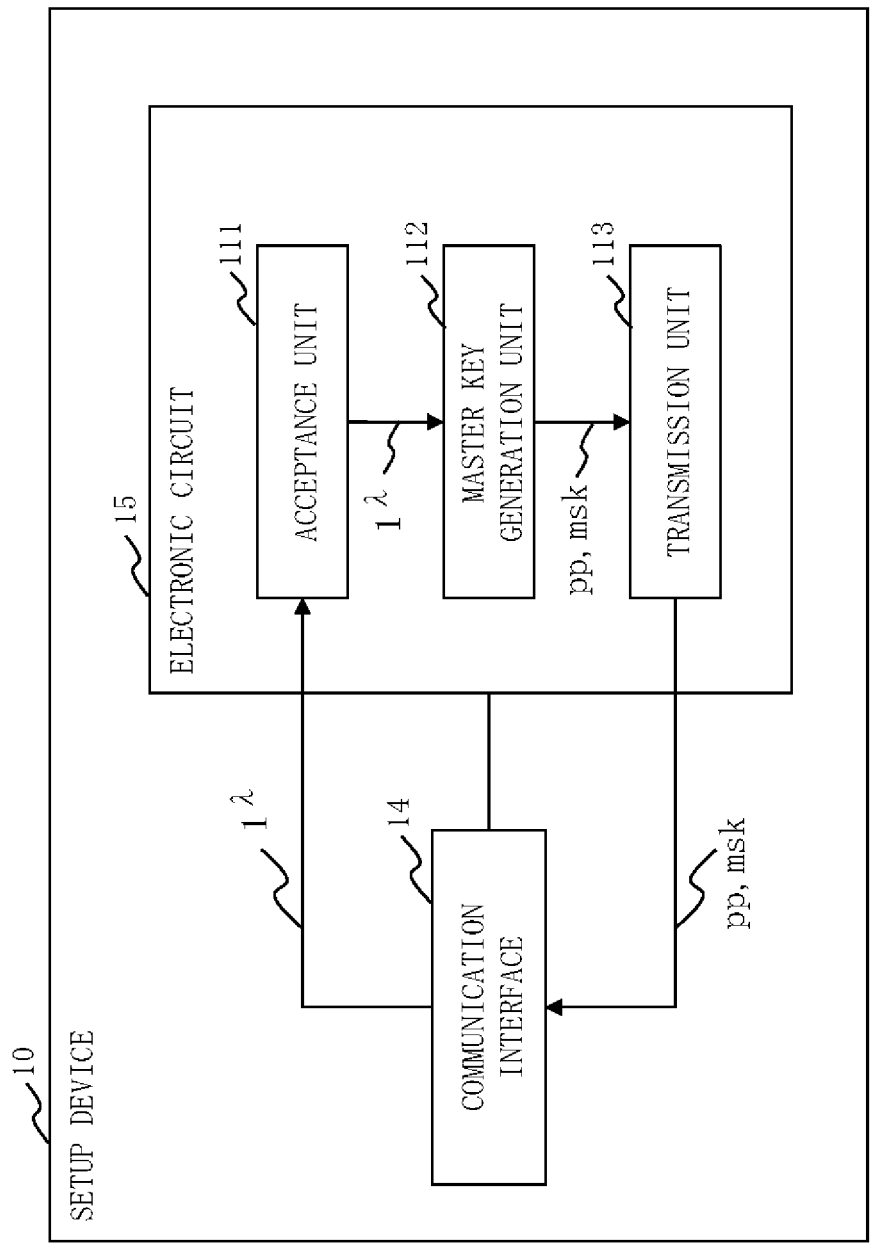
FIG. 10 is a configuration diagram of the setup device 10 according to a first variation.

Referring to FIG. 10, a configuration of the setup device 10 according to the first variation will be described.

When the functional components are realized by hardware, the setup device 10 includes an electronic circuit 15 in place of the processor 11, the memory 12, and the storage 13. The electronic circuit 15 is a dedicated circuit that realizes the functions of the functional components, the memory 12, and the storage 13.

Figure 11:
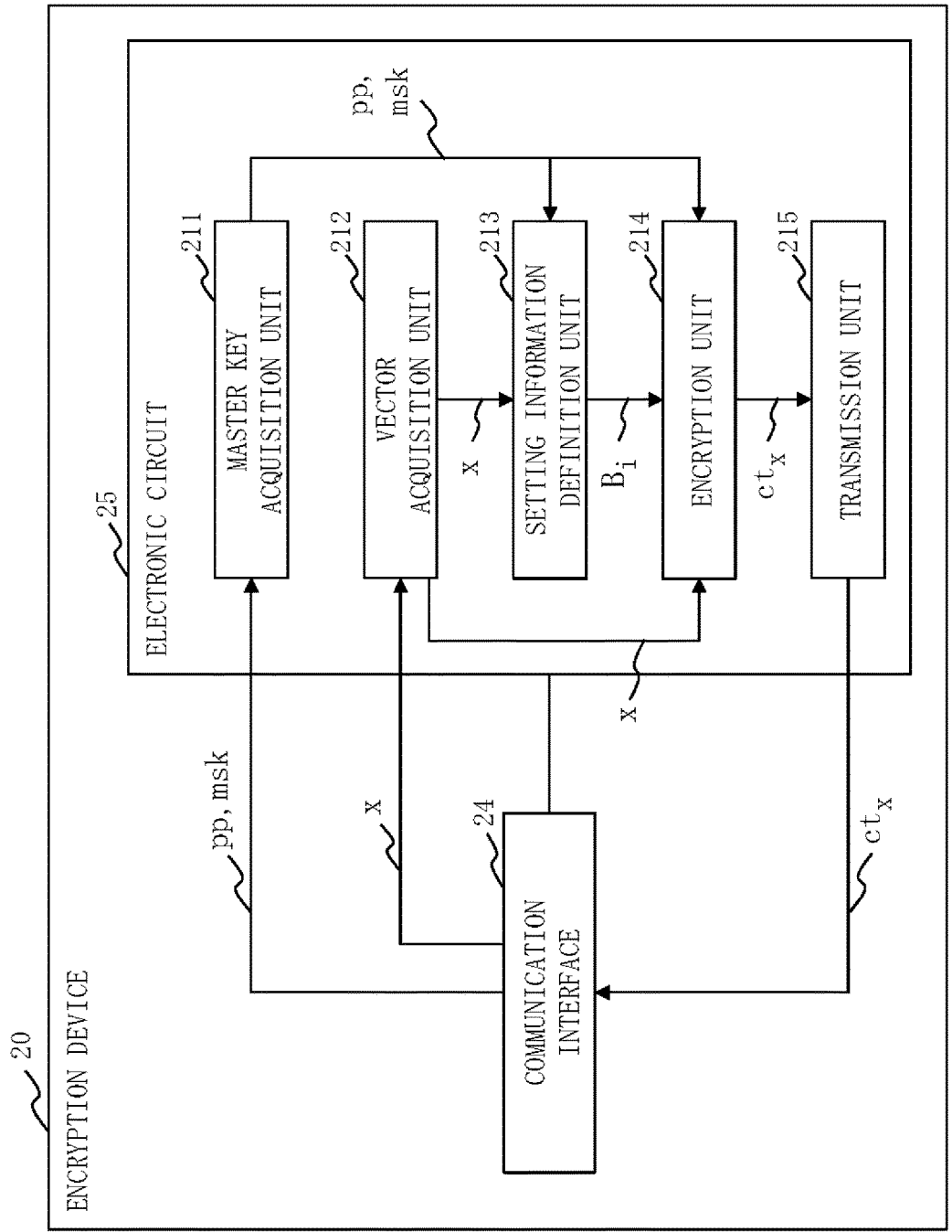
FIG. 11 is a configuration diagram of the encryption device 20 according to the first variation.

Referring to FIG. 11, a configuration of the encryption device 20 according to the first variation will be described.

When the functional components are realized by hardware, the encryption device 20 includes an electronic circuit 25 in place of the processor 21, the memory 22, and the storage 23. The electronic circuit 25 is a dedicated circuit that realizes the functions of the functional components, the memory 22, and the storage 23.

Figure 12:
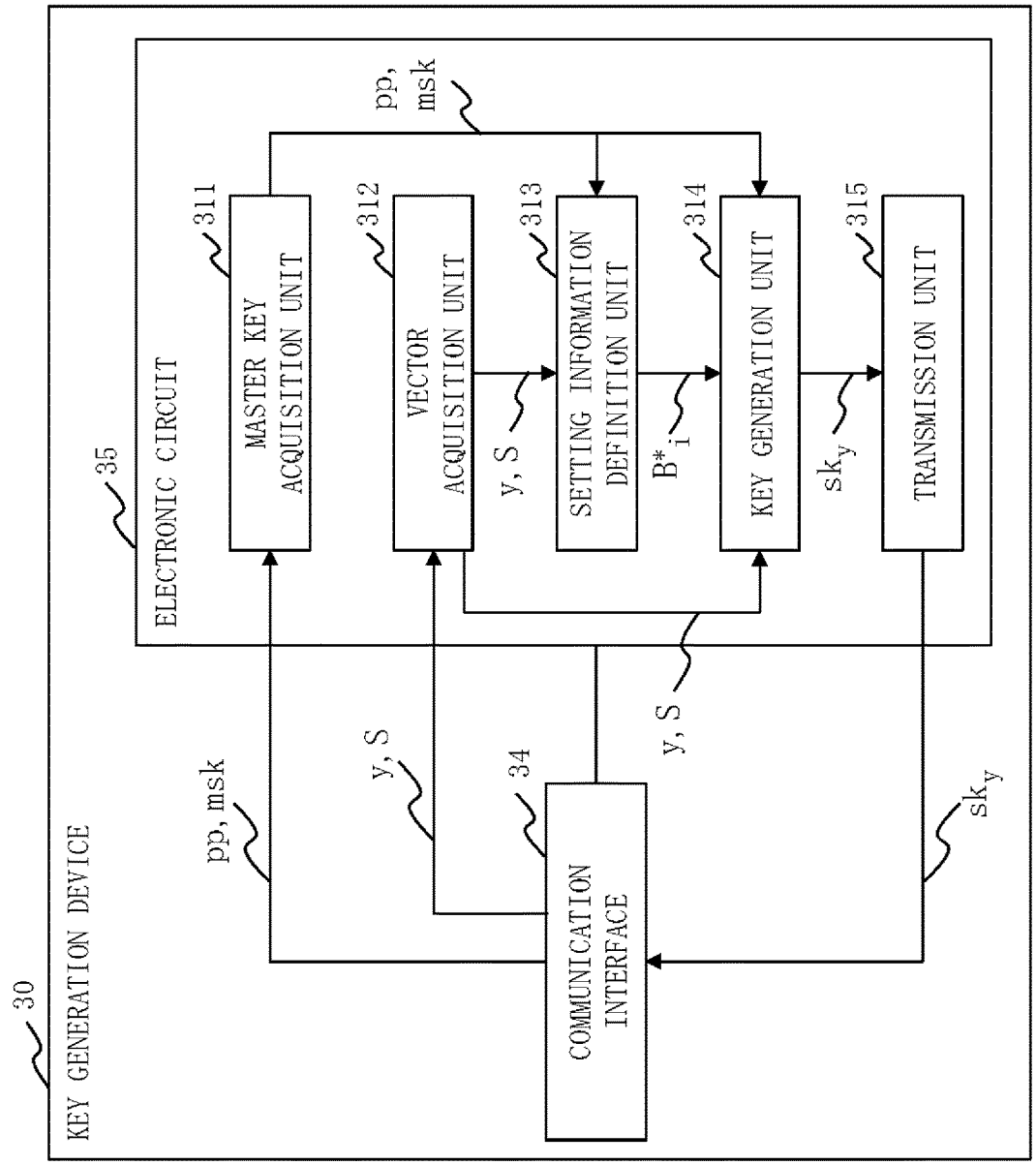
FIG. 12 is a configuration diagram of the key generation device 30 according to the first variation.

Referring to FIG. 12, a configuration of the key generation device 30 according to the first variation will be described.

When the functional components are realized by hardware, the key generation device 30 includes an electronic circuit 35 in place of the processor 31, the memory 32, and the storage 33. The electronic circuit 35 is a dedicated circuit that realizes the functions of the functional components, the memory 32, and the storage 33.

Figure 13:
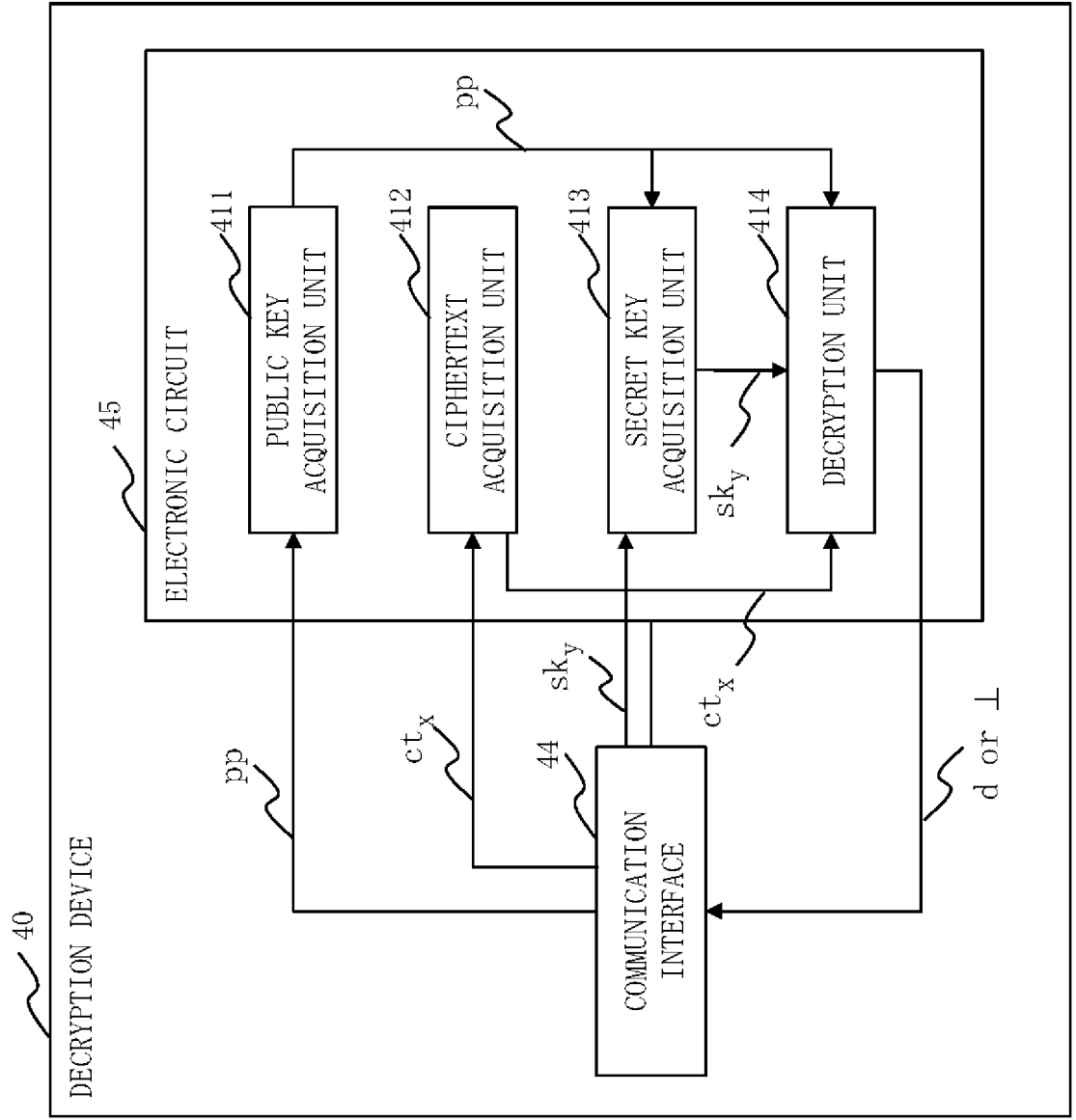
FIG. 13 is a configuration diagram of the decryption device 40 according to the first variation.

Referring to FIG. 13, a configuration of the decryption device 40 according to the first variation will be described.

When the functional components are realized by hardware, the decryption device 40 includes an electronic circuit 45 in place of the processor 41, the memory 42, and the storage 43. The electronic circuit 45 is a dedicated circuit that realizes the functions of the functional components, the memory 42, and the storage 43.

Each of the electronic circuits 15, 25, 35, and 45 is assumed to be a single circuit, a composite circuit, a programmed-processor, a parallel-programmed processor, a logic IC, a gate array (GA), an application specific integrated circuit (ASIC), or a field-programmable gate array (FPGA).

The functional components may be realized by one electronic circuit 15, one electronic circuit 25, one electronic circuit 35, and one electronic circuit 45, or the functional components may be distributed among and realized by a plurality of electronic circuits 15, a plurality of electronic circuits, 25, a plurality of electronic circuits 35, and a plurality of electronic circuits 45, respectively.

<Second Variation>

As a second variation, some of the functional components may be realized by hardware, and the rest of the functional components may be realized by software.

Each of the processors 11, 21, 31, and 41, the memories 12, 22, 32, and 42, the storages 13, 23, 33, and 43, and the electronic circuits 15, 25, 35, and 45 is referred to as processing circuitry. That is, the functions of the functional components are realized by the processing circuitry.

Second Embodiment

In a second embodiment, public-key UIPFE will be described. In the second embodiment, differences from the first embodiment will be described, and description of the same aspects will be omitted.

*Description of Configurations*

<Construction of Public-Key UIPFE>

The public-key UIPFE is UIPFE with a public key setting. The public key setting is a scheme in which generation of a ciphertext requires only a public key and does not require a secret key.

The public-key UIPFE includes a Setup algorithm, an Enc algorithm, a KeyGen algorithm, and a Dec algorithm. Let $X:=\{X_\lambda\}_{\lambda \in N}$ and $Y:=\{Y_\lambda\}_{\lambda \in N}$ be ensembles of norm upper limits, where N is a set of natural numbers.

The Setup algorithm takes as input a security parameter $1^\lambda$, and outputs a public parameter pp and a master secret key msk.

The Enc algorithm takes as input the public parameter pp and a vector $x:=(x_1, \ldots, x_m)$, and outputs a ciphertext $ct_x$. Note that $m:=m(\lambda)$ is a polynomial.

The KeyGen algorithm takes as input the public parameter pp, the master secret key msk, a non-empty set $S:=[s]$, and an indexed vector $y:=(y_i)_{i \in S}$, and outputs a secret key $sk_y$. Note that $s:=s(\lambda)$ is a polynomial.

The Dec algorithm takes as input the public parameter pp, the ciphertext $ct_x$, and the secret key $sk_y$, and outputs a decrypted value $d \in Z$ or outputs an identifier $\perp$. Note that X is a set of integers. The identifier $\perp$ indicates that decryption is not possible.

<Configuration of Cryptographic System 1>

Referring to FIG. 14, a configuration of the cryptographic system 1 according to the second embodiment will be described.

The cryptographic system 1 includes the setup device 10, the encryption device 20, the key generation device 30, and the decryption device 40. The setup device 10, the encryption device 20, the key generation device 30, and the decryption device 40 are connected via a network.

The cryptographic system 1 differs from the cryptographic system 1 illustrated in FIG. 1 in that the master secret key msk is not transmitted from the setup device 10 to the encryption device 20.

*Description of Operation*

In the following description, norm upper limits $X_\lambda$ and $Y_\lambda$ are certain polynomials.

Referring to FIG. 6, operation of the setup device 10 according to the second embodiment will be described.

The operation of the setup device 10 according to the second embodiment corresponds to the setup method according to the second embodiment. The operation of the setup device 10 according to the second embodiment also corresponds to processes of the setup program according to the second embodiment.

The process of step S11 is the same as that in the first embodiment.

(Step S12: Master Key Generation Process)

The master key generation unit 112 selects a bilinear group G, using as input the security parameter $1^\lambda$ accepted in step S11. The master key generation unit 112 also generates a regular matrix B of 7×7.

Specifically, the master key generation unit 112 retrieves the security parameter $1^\lambda$ from the memory 12. The master key generation unit 112 executes the bilinear group generation algorithm $G_{BG}$ to select the bilinear group G, using as input the security parameter $1^\lambda$. The master key generation unit 112 randomly generates the regular matrix B of 7×7, as indicated in Formula 137. The master key generation unit 112 generates an adjoint matrix $B^*:=(B^{-1})^T$ of the regular matrix B. The master key generation unit 112 writes the bilinear group G, the regular matrix B, and the adjoint matrix $B^*$ in the memory 12.

$$B \xleftarrow{U} GL_7(\mathbb{Z}_p) \qquad \text{[Formula 137]}$$

(Step S13: Transmission Process)

The transmission unit 113 publishes, as a public parameter pp, the bilinear group G selected in step S12 and an element $[b_i]_1$ which is a group element $g_1$ in whose exponent part an element in the i-th row of the regular matrix B for each integer i of $i=1, \ldots, 4$ is set. Specifically, the transmission unit 113 retrieves the bilinear group G from the memory 12. Using the element $g_1$ included in the bilinear group G, the transmission unit 113 generates the element $[b_i]_1$ by setting the element in the i-th row of the regular matrix B for each integer i of $i=1, \ldots, 4$ in the exponent part of the group element $g_1$. The transmission unit 113 publishes the bilinear group G and the elements $[b_1]_1, \ldots, [b_4]_1$ as the public parameter pp by a method such as transmitting them to a server for publication. This allows the encryption device 20, the key generation device 30, and the decryption device 40 to acquire the bilinear group G and the elements $[b_1]_1, \ldots, [b_4]_1$.

The transmission unit 113 transmits an element $b^*_i$ in the i-th row of the adjoint matrix $B^*$ for each integer i of $i=1, \ldots, 4$ as a master secret key msk to the key generation device 30 in secrecy. Specifically, the transmission unit 113 retrieves the adjoint matrix $B^*$ from the memory 12. The transmission unit 113 encrypts the element $b^*_i$ in the i-th row of the adjoint matrix $B^*$ for each integer i of $i=1, \ldots, 4$, using an existing encryption scheme, and then transmits these elements as the master secret key msk to the key generation device 30.

That is, the setup device 10 executes the Setup algorithm as indicated in Formula 138.

$$\text{Setup}(1^\lambda): \qquad \text{[Formula 138]}$$
$$G \leftarrow G_{BG}(1^\lambda), B \xleftarrow{U} GL_7(\mathbb{Z}_p),$$

-continued $$pp := (\mathbb{G}, [b_1]_1, \ldots, [b_4]_1),$$

$$msk := (b_1^*, \ldots, b_4^*).$$

Referring to FIG. 7, operation of the encryption device 20 according to the second embodiment will be described.

The operation of the encryption device 20 according to the second embodiment corresponds to the encryption method according to the second embodiment. The operation of the encryption device 20 according to the second embodiment also corresponds to processes of the encryption program according to the second embodiment.

The processes of the steps S22 and S25 are the same as those in the first embodiment.

(Step S21: Master Key Acquisition Process)

The master key acquisition unit 211 acquires the bilinear group G and the elements $[b_1]_1, \ldots, [b_4]_1$, which are the public parameter pp, generated by the setup device 10.

Specifically, the master key acquisition unit 211 acquires the published public parameter pp via the communication interface 24. The master key acquisition unit 211 writes the public parameter pp in the memory 22.

(Step S23: Setting Information Generation Process)

The setting information definition unit 213 defines information such that index information I generated for each element of the vector x is set in the public information of the fixed size generated in step S21, as encryption setting information of a size depending on the size of the vector x to be encrypted that is acquired in step S22.

Specifically, the setting information definition unit 213 generates a random number $\pi_i$, as indicated in Formula 139, for each integer i of i=1, ..., m.

$$\pi_i \xleftarrow{U} \mathbb{Z}_p \quad \text{[Formula 139]}$$

Then, the setting information definition unit 213 defines, as encryption setting information $B_i$, information in which a combination of the random number $\pi_i$ and a value obtained by multiplying the random number $\pi_i$ by a value i is set, which is the index information I, as indicated in Formula 140, for each integer i of i=1, ..., m.

$$B_i := (\pi_i(1,i),0,0,0,0,0)B \quad \text{[Formula 140]}$$

That is, as in the first embodiment, the setting information definition unit 213 encrypts the index i and defines the encryption setting information in which the index i is set, although the method is different from that in the first embodiment.

(Step S24: Encryption Process)

The encryption unit 214 encrypts the vector x to generate a ciphertext $ct_x$, using the encryption setting information defined in step S23.

Specifically, the encryption unit 214 defines, as an element $c_i$, information in which an element $x_i$ and a random number z are set, as indicated in Formula 141, for each integer i of i=1, ..., m.

$$c_i := (0, 0, x_i, z, 0, 0, 0)B + B_i \quad \text{[Formula 141]}$$

where $$z \xleftarrow{U} \mathbb{Z}_p$$

That is, the element $c_i$ is defined as indicated in Formula 142.

$$c_i := (\pi_i(1,i), x_i, z, 0, 0, 0)B \in \mathbb{Z}_p^7 \quad \text{[Formula 142]}$$

The encryption unit 214 retrieves a group element $g_1$ of a group $G_1$ included in the bilinear group G, which is the public parameter pp, from the memory 12. The encryption unit 214 generates an element $[c_i]_1$ which is the group element $g_1$ in whose exponent part each element $c_i$ for each integer i of i=1, ..., m is set. The encryption unit 214 writes the element $[c_i]_1$ for each integer i of i=1, ..., m as the ciphertext $ct_x$ in the memory 22, as indicated in Formula 143.

$$ct_x := ([c_1]_1, \ldots, [c_m]_1) \quad \text{[Formula 143]}$$

That is, the encryption device 20 executes the Enc algorithm as indicated in Formula 144.

$$Enc(pp, x := (x_1, \ldots, x_m) \in \mathbb{Z}^m \quad \text{[Formula 144]}$$

where $m := m(\lambda)$ is any polynomial):

$$c_i := (\pi_i(1, i), x_i, z, 0, 0, 0)B \text{ for all } i \in [m],$$

where $\pi_i, z \xleftarrow{U} \mathbb{Z}_p,$ $$ct_x := ([c_1]_1, \ldots, [c_m]_1).$$

Referring to FIG. 8, operation of the key generation device 30 according to the second embodiment will be described.

The operation of the key generation device 30 according to the second embodiment corresponds to the key generation method according to the second embodiment. The operation of the key generation device 30 according to the second embodiment also corresponds to processes of the key generation program according to the second embodiment.

The processes of steps S32 and S35 are the same as those in the first embodiment.

(Step S31: Master Key Acquisition Process)

The master key acquisition unit 311 acquires the bilinear group G and the elements $[b_1]_1, \ldots, [b_4]_1$, which are the public parameter pp, and the elements $b_1^*, \ldots, b_4^*$, which are the master secret key msk, generated by the setup device 10.

Specifically, the master key acquisition unit 311 acquires the published public parameter pp and acquires the master secret key msk transmitted by the setup device 10, via the communication interface 34. The master key acquisition unit 311 writes the public parameter pp and the master secret key msk in the memory 32.

(Step S33: Setting Information Generation Process)

The setting information definition unit 313 defines key setting information of a size depending on the size of the vector y acquired in step S32, using as input the elements $b_1^*, \ldots, b_4^*$, which are the master secret key msk being secret information of a fixed size, acquired in step S31.

Specifically, the setting information definition unit 313 retrieves the master secret key msk and the set S from the memory 32. The setting information definition unit 313 generates a random number pi, as indicated in Formula 145, for each integer i of i∈ S.

$$\rho_i \xleftarrow{U} \mathbb{Z}_p \quad \text{[Formula 145]}$$

Then, the setting information definition unit 313 generates, as key setting information $B^*_i$, information in which a combination of a value obtained by multiplying the random number $\rho_i$ by a value −i and the random number $\rho_i$ is set, which is index information I', as indicated in Formula 146, for each integer i of i∈ S.

$$B^*_i := (\rho_i(-i,1),0,0,0,0,0)B^* \quad \text{[Formula 146]}$$

That is, as in the first embodiment, the setting information definition unit 313 encrypts the index i and generates the key setting information in which the index i is set, although the method is different from that in the first embodiment.

(Step S34: Key Generation Process)

The key generation unit 314 generates a secret key $sk_y$ in which the vector y is set, using the key setting information defined in step S33.

Specifically, the key generation unit 314 generates a random number $r_i$, as indicated in Formula 147, for each integer i of i∈ S.

$$r_i \xleftarrow{U} \mathbb{Z}_p \text{ s.t. } \sum_{i \in S} r_i = 0 \quad \text{[Formula 147]}$$

The key generation unit 314 generates an element $k_i$ using the random number $r_i$, as indicated in Formula 148, for each integer i of i∈ S.

$$k_i := (0,0,y_i,r_i,0,0,0)B^* + B^*_i \quad \text{[Formula 148]}$$

That is, the element $k_i$ is as indicated in Formula 149.

$$k_i := (\rho_i(-i,1),y_i,r_i,0,0,0)B^* \in \mathbb{Z}_p^7 \quad \text{[Formula 149]}$$

The key generation unit 314 retrieves a group element $g_2$ of a group $G_2$ included in the bilinear group G, which is the public parameter pp, from the memory 12. The key generation unit 314 generates an element $[k_i]_2$ which is the group element $g_2$ in whose exponent part each element $k_i$ is set, for each integer i of i∈ S. The key generation unit 314 writes the set S and the element $[k_i]_2$ for each integer i of i∈ S as the secret key $sk_y$ in the memory 32, as indicated in Formula 150.

$$sk_y := (S, \{[k_i]_2\}_{i \in S}) \quad \text{[Formula 150]}$$

That is, the key generation device 30 executes the Key-Gen algorithm as indicated in Formula 151.

$$KeyGen(pp, msk, S \subseteq [s] \text{ where } m := \quad \text{[Formula 151]}$$
$$m(\lambda) \text{ is any polynomial}, y := (y_i)_{i \in S} \in \mathbb{Z}^S):$$
$$\{r_i\}_{i \in S} \xleftarrow{U} \mathbb{Z}_p \text{ s.t. } \sum_{i \in S} r_i = 0, \rho_i \xleftarrow{U} \mathbb{Z}_p,$$
$$k_i := (\rho_i(-i,1), y_i, r_i, 0, 0, 0)B^* \in \mathbb{Z}_p^7$$
$$\text{for all } i \in S, sk_y := (S, \{[k_i]_2\}_{i \in S}).$$

The operation of the decryption device 40 according to the second embodiment is the same as the operation of the decryption device 40 according to the first embodiment.

\*\*\*Effects of Second Embodiment\*\*\*

As described above, the cryptographic system 1 according to the second embodiment allows construction of an IPFE scheme in which the maximum length of a ciphertext and the maximum length of a secret key are not restricted, as in the first embodiment.

The encryption setting information and the key setting information are generated using the index information I and the index information I', using as input the public information. This allows the encryption setting information and the key setting information to be generated randomly from the public information of the fixed size.

\*\*\*Other Configurations\*\*\*

<Third Variation>

In the second embodiment, the index information I is the combination of the random number $\pi_i$ and the value obtained by multiplying the random number $\pi_i$ by the value i, and the index information I' is the combination of the value obtained by multiplying the random number $\rho_i$ by the value −i and the random number $\rho_i$. The index information I and the index information I' are not limited to these, provided that values result in an inner-product value of 0.

Third Embodiment

In the first and second embodiments, the (E:con, K:sep, D:ct-dom) setting has been described. In a third embodiment, other settings will be described. In the third embodiment, differences from the first and second embodiments will be described, and description of the same aspects will be omitted.

As other settings, the following seven settings 1 to 7 may be considered.

Setting 1: (E:con, K:con, D:ct-dom) Setting

This is a scheme in which for a ciphertext that is a vector of a length m and a secret key that is a vector of a length n, the ciphertext can be decrypted with the secret key and an inner-product value concerning [n] can be obtained only if n≤m.

Setting 2: (E:sep, K:sep, D:ct-dom) Setting

This is a scheme in which for a ciphertext to which a set U is added and a secret key to which a set S is added, the ciphertext can be decrypted with the secret key and an inner-product value concerning the set S can be obtained only if S⊆U.

Setting 3: (E:con, K:con, D:sk-dom) Setting

This is a scheme in which for a ciphertext that is a vector of a length m and a secret key that is a vector of a length n, the ciphertext can be decrypted with the secret key and an inner-product value concerning [m] can be obtained only if m≤n.

Setting 4: (E:sep, K:con, D:sk-dom) Setting

This is a scheme in which for a ciphertext to which a set U is added and a secret key that is a vector of a length n, the ciphertext can be decrypted with the secret key and an inner-product value concerning the set U can be obtained only if U⊆[n].

Setting 5: (E:sep, K:sep, D:sk-dom) Setting

This is a scheme in which for a ciphertext to which a set U is added and a secret key to which a set S is added, the ciphertext can be decrypted with the secret key and an inner-product value concerning the set U can be obtained only if U⊆S.

Setting 6: (E:con, K:con, D:eq) Setting

This is a scheme in which for a ciphertext that is a vector of a length m and a secret key that is a vector of the length m, an inner-product value concerning [m] can be obtained.

Setting 7: (E:sep, K:sep, D:eq) Setting

This is a scheme in which for a ciphertext to which a set S is added and a secret key to which the set S is added, the ciphertext can be decrypted with the secret key and an inner-product value concerning the set S can be obtained.

Differences in operation in each of the settings will be described.

A difference in "E:xx, K:yy, D:zz" affects the condition for allowing the ciphertext to be decrypted with the secret key. Specifically, the difference affects details of determination in step S44 of FIG. 9.

In the first and second embodiments, E:con, K:sep, and D:ct-dom are adopted, so that the ciphertext can be decrypted with the secret key only if $S \subseteq [m]$. Therefore, in step S44 of FIG. 9, whether or not $S \subseteq [m]$ holds true is determined. In other settings, a determination depending on each setting is performed in step S44 of FIG. 9. The details of the determination are as described for each setting.

Note that D:eq assumes that the length of the vector of the ciphertext and the length of the vector of the secret key are the same, or the set added to the ciphertext and the set added to the secret key are the same. Therefore, step S44 of FIG. 9 is not necessary. Alternatively, it may be determined in step S44 of FIG. 9 whether the length of the vector of the ciphertext and the length of the vector of the secret key are the same, or whether the set added to the ciphertext and the set added to the secret key are the same.

A difference in D:zz affects how to set random numbers for the element $c_i$ of the ciphertext $ct_x$ and the element $k_i$ of the secret key $sk_y$. Specifically, it affects how to set the random number z that is set in step S24 of FIG. 7 and how to set the random number $r_i$ that is set in step S34 of FIG. 8.

In the first and second embodiments, D:ct-dom is adopted, so that the random number $r_i$ is set in the element $k_i$ of the secret key $sk_y$. The random number z is set in an element of the element $c_i$ corresponding to an element of the element $k_i$ in which the random number $r_i$ is set. The secret key $sk_y$ is bound by this and the ciphertext $ct_x$ is also bound by this. The random number $r_i$ is generated so that the sum of the random numbers $r_i$ for each integer i included in the set S of the secret key $sk_y$ is 0. That is, the random number $r_i$ is generated so that the sum of the random numbers $r_i$ for all elements $k_i$ is 0.

In other settings, which of the random number $r_i$ and the random number z is set in which of the element $c_i$ and the element $k_i$ is changed depending on D:zz. Specifically, in the case of D:ct-dom, the random number $r_i$ is set in the element $k_i$ and the random number z is set in the element $c_i$, as described above. In this case, the random number $r_i$ is generated so that the sum of the random numbers $r_i$ for all elements $k_i$ is 0. In the case of D:sk-dom, the random number $r_i$ is set in the element $c_i$ and the random number z is set in the element $k_i$. In this case, the random number $r_i$ is generated so that the sum of the random numbers $r_i$ for all elements $c_i$ is 0. In the case of D:eq, the random number $r_i$ is set in the element $k_i$, the random number z is set in the element $c_i$, a random number $r'_i$ is set in the element $c_i$, and a random number z' is set in the element $k_i$. In this case, the random number $r_i$ is generated so that the sum of the random numbers $r_i$ for all elements $k_i$ is 0 and the random number $r'_i$ is generated so that the sum of the random numbers $r'_i$ for all element $c_i$ is 0. Note that the random number $r'_i$ is a random number that is different from the random number $r_i$, but fulfills substantially the same role as that of the random number $r_i$. The random number z' is a random number that is different from the random number z, but fulfills substantially the same role as that of the random number z.

As described above, the cryptographic system 1 according to the third embodiment allows construction of an IPFE scheme in which the maximum length of a ciphertext and the maximum length of a secret key are not restricted also with settings different from the setting described in the first and second embodiments.

Fourth Embodiment

In a fourth embodiment, a scheme that can efficiently realize the processes of the private-key UIPFE described in the first embodiment will be described. In the fourth embodiment, differences from the first embodiment will be described, and description of the same aspects will be omitted.

In the fourth embodiment, the (E:con, K:con, D:eq) setting will be described. That is, in the fourth embodiment, the setting 6 described in the third embodiment will be described.

In the following description, binary$_\lambda$ indicated in Formula 152 is a function that converts an input into a binary format and generates data of $\lambda$ bits by adding 0 to the converted data.

$$\text{binary}_\lambda : \{x | x \in \mathbb{N} \wedge x < 2^\lambda\} \rightarrow \{0,1\}^\lambda \qquad \text{[Formula 152]}$$

The operation of the setup device 10 is the same as that in the first embodiment.

The encryption device 20 executes the Enc algorithm as indicated in Formula 153.

$$Enc(pp, msk, x) := \qquad \text{[Formula 153]}$$

$(x_1, \ldots, x_m) \in \mathbb{Z}^m$ where $m := m(\lambda)$ is any polynomial):

$B_i := F_K(binary_\lambda(m) \| binary_\lambda(i(2m+3)+j))$, $B_m := (b_{i,j})_{i,j \in [2m+3]} \in M_{2m+3}(\mathbb{Z}_p)$, $c_m := (x, 0^m, r, 0, 0)B_i \in \mathbb{Z}_p^{2m+3}$, where $r \xleftarrow{U} \mathbb{Z}_p$, $ct_x := [c_m]_1$.

If $B_m$ is a singular matrix, outputs $\perp$.

The key generation device 30 executes the KeyGen algorithm as indicated in Formula 154.

$$KeyGen(pp, msk, y) := (y_1, \ldots, y_n) \in \mathbb{Z}^n \qquad \text{[Formula 154]}$$

$n := n(\lambda)$) is any polynomial):

$b_{i,j} := F_K(binary_\lambda(m) \| binary_\lambda(i(2n+3)+j))$, $B_n := (b_{i,j})_{i,j \in [2n+3]} \in M_{2n+3}(\mathbb{Z}_p)$, $k_n := (y, 0^n, 0, s, 0)B_n^* \in \mathbb{Z}_p^{2n+3}$, where $s \xleftarrow{U} \mathbb{Z}_p$, $sk_y := [k_n]_2$.

If $B_n$ is a singular matrix, outputs $\perp$.

The decryption device 40 executes the Dec algorithm as indicated in Formula 155.

$Dec(pp, ct_x, sk_y)$: [Formula 155]

If m=n,
h:=e($[c_m]_1,[k_n]_2$),
searches for d s.t. $e(g_1,g_2)^d=h$
exhaustively in the range of $-mX_\lambda Y_\lambda$ to $mX_\lambda Y_\lambda$,
If such d is found, outputs d.
Otherwise, outputs ⊥.

The (E:con, K:con, D:eq) setting has been described herein. However, other settings can also be realized based on the same concept. In the case of E:sep and K:sep, $B_U$ is to be generated for each set S in place of $B_m$ in the Enc algorithm, and $B_S$ is to be generated for each set U in place of $B_n$ in the KeyGen algorithm.

REFERENCE SIGNS LIST

1: cryptographic system, 10: setup device, 11: processor, 12: memory, 13: storage, 14: communication interface, 15: electronic circuit, 111: acceptance unit, 112: master key generation unit, 113: transmission unit, 20: encryption device, 21: processor, 22: memory, 23: storage, 24: communication interface, 25: electronic circuit, 211: master key acquisition unit, 212: vector acquisition unit, 213: setting information definition unit, 214: encryption unit, 215: transmission unit, 30: key generation device, 31: processor, 32: memory, 33: storage, 34: communication interface, 35: electronic circuit, 311: master key acquisition unit, 312: vector acquisition unit, 313: setting information definition unit, 314: key generation unit, 315: transmission unit, 40: decryption device, 41: processor, 42: memory, 43: storage, 44: communication interface, 45: electronic circuit, 411: public key acquisition unit, 412: ciphertext acquisition unit, 413: secret key acquisition unit, 414: decryption unit

The invention claimed is:

1. A decryption device comprising:
processing circuitry to:
acquire a ciphertext $ct_x$ in which a vector x is encrypted using encryption setting information of a size depending on a size of the vector x, the encryption setting information being defined using as input public information of a fixed size,
acquire a secret key $sk_y$ in which a vector y is set using key setting information of a size depending on a size of the vector y, the key setting information being defined using as input the public information, and
decrypt the acquired ciphertext $ct_x$ with the acquired secret key $sk_y$ to calculate an inner-product value of the vector x and the vector y,
wherein the encryption setting information and the key setting information are defined by a pseudorandom function, using as input the public information,
wherein the encryption setting information is a matrix B,
wherein the ciphertext $ct_x$ includes an element $[c_i]_1$ which is a group element in which a product of each element $x_i$ of the vector x and the matrix B is set,
wherein the key setting information is an adjoint matrix B* of the matrix B,
wherein the secret key $sk_y$ includes an element $[k_i]_2$ which is a group element in which a product of each element $y_i$ of the vector y and the adjoint matrix B* is set, and
wherein the processing circuitry calculates the inner-product value by calculating a pairing operation on the ciphertext $ct_x$ and the secret key $sk_y$,
wherein the ciphertext $ct_x$ includes an element $[c_i]_1$ which is a group element in which an element $c_i$ indicated in Formula 1 is set, where an integer m is 1 or more and a matrix $B_i$ is the matrix B for each integer i of i=1, . . . , m, and wherein the secret key $sk_y$ includes an element $[k_i]_2$ which is a group element in which an element $k_i$ indicated in Formula 2 is set, where a set S is a set of integers and a matrix $B^*_i$ is the adjoint matrix B* for each integer i included in the set S, $$c_i := (x_i, 0, z, 0)B_i \in \mathbb{Z}_p^4 \text{ for } i = 1, \dots m \qquad \text{[Formula 1]}$$

where $$x := (x_1, \dots, x_m) \in \mathbb{Z}^m,$$

$$z \xleftarrow{U} \mathbb{Z}_p$$

$$k_i := (y_i, 0, r_i, 0)B^*_j \in \mathbb{Z}_p^4 \text{ for } i \qquad \text{[Formula 2]}$$

where $$y := (y_i)_{i \in S} \in \mathbb{Z}^S,$$

$$r_i \xleftarrow{U} \mathbb{Z}_p \text{ s.t. } \sum_{i \in S} r_i = 0.$$

2. A decryption device comprising:
processing circuitry to:
acquire a ciphertext $ct_x$ in which a vector x is encrypted using encryption setting information of a size depending on a size of the vector x, the encryption setting information being defined using as input public information of a fixed size,
acquire a secret key $sk_y$ in which a vector y is set using key setting information of a size depending on a size of the vector y, the key setting information being defined using as input the public information, and
decrypt the acquired ciphertext $ct_x$ with the acquired secret key $sk_y$ to calculate an inner-product value of the vector x and the vector y,
wherein the encryption setting information is defined by setting index information I generated for each element of the vector x in the public information, and
wherein the key setting information is defined by setting index information I' generated for each element of the vector y in the public information, the index information I' being generated so that an inner-product value of the index information I' and the index information I generated for a corresponding element of the vector x is 0,
wherein the processing circuitry calculates the inner-product value by calculating a pairing operation on the ciphertext $ct_x$ and the secret key $sk_y$.

3. The decryption device according to claim 2,
wherein the ciphertext $ct_x$ includes an element $[c_i]_1$ which is a group element in which a product of a vector in which the index information I and a target element $x_i$ are set and the matrix B, which is the public information, is set, the target element $x_i$ being each element $x_i$ of the vector x,
wherein the secret key $sk_y$ includes an element $[k_i]_2$ which is a group element in which a product of a vector in which the index information I' and a target element $y_i$ are set and the adjoint matrix B* of the matrix B is set, the target element $y_i$ being each element $y_i$ of the vector y, and
wherein the processing circuitry calculates the inner-product value by calculating a pairing operation on the ciphertext $ct_x$ and the secret key $sk_y$.

4. The decryption device according to claim 3,
wherein the ciphertext $ct_x$ includes an element $[c_i]_1$ which is a group element in which an element $c_i$ indicated in Formula 3 is set, where an integer m is 1 or more and $\pi_i(1,i)$ is index information I for each integer i of i=1, ..., m, and wherein the secret key $sk_y$ includes an element $[k_i]_2$ which is a group element in which an element $k_i$ indicated in Formula 4 is set, where a set S is a set of integers and $\rho_i(-i,1)$ is index information I' for each integer i included in the set S $$c_i := (x_i(1, i), x_i, z, 0, 0, 0)B_i \in \mathbb{Z}_p^7 \text{ for } \quad \text{[Formula 3]}$$

$i = 1, \ldots m$ where $\pi_i \xleftarrow{U} \mathbb{Z}_p,$ $x := (x_1, \ldots, x_m) \in \mathbb{Z}^m,$ $z \xleftarrow{U} \mathbb{Z}_p$ $$k_i := (\rho_i(-i, 1), y_i, r_i, 0, 0, 0)B^* \quad \text{[Formula 4]}$$

where $\rho_i \xleftarrow{U} \mathbb{Z}_p,$ $y := (y_i)_{i \in S} \in \mathbb{Z}^S,$ $r_i \xleftarrow{U} \mathbb{Z}_p \text{ s.t. } \sum_{i \in S} r_i = 0.$

5. An encryption device in a cryptographic system that decrypts a ciphertext $ct_x$ in which a vector x is encrypted with a secret key $sk_y$ in which a vector y is set, and thereby calculates an inner-product value of the vector x and the vector y, the encryption device comprising:

processing circuitry to:
define encryption setting information of a size depending on a size of a vector x to be encrypted, using as input public information of a fixed size, and
encrypt the vector x to generate a ciphertext $ct_x$, using the defined encryption setting information,
wherein the processing circuitry defines the encryption setting information by a pseudorandom function, using as input the public information,
wherein the processing circuitry defines a matrix B as the encryption setting information, and
generates the ciphertext $ct_x$ including an element $[c_i]_1$ which is a group element in which a product of each element $x_i$ of the vector x and the matrix B is set,
wherein the processing circuitry generates the ciphertext $ct_x$ including an element $[c_i]_1$ which is a group element in which an element $c_i$ indicated in Formula 5 is set, where an integer m is 1 or more and a matrix $B_i$ is the matrix B for each integer i of i=1, ..., m, $$c_i := (x_i, 0, z, 0)B_i \in \mathbb{Z}_p^4 \text{ for } \quad \text{[Formula 5]}$$

where $x := (x_i, \ldots, x_m) \in \mathbb{Z}^m,$ $z \xleftarrow{U} \mathbb{Z}_p.$

6. The encryption device in a cryptographic system that decrypts a ciphertext $ct_x$ in which a vector x is encrypted with a secret key $sk_y$ in which a vector y is set, and thereby calculates an inner-product value of the vector x and the vector y, the encryption device comprising:

processing circuitry to:
define encryption setting information of a size depending on a size of a vector x to be encrypted, using as input public information of a fixed size, and
encrypt the vector x to generate a ciphertext $ct_x$, using the defined encryption setting information,
wherein the processing circuitry defines information such that index information I generated for each element of the vector x is set in the public information, as the encryption setting information.

7. The encryption device according to claim 6, wherein the processing circuitry generates the ciphertext $ct_x$ including an element $[c_i]_1$ which is a group element in which a product of a vector in which the index information I and a target element are set and a matrix B, which is the public information, is set, the target element being each element $x_i$ of the vector x.

8. The encryption device according to claim 7, wherein the processing circuitry generates the ciphertext $ct_x$ including an element $[c_i]_1$ which is a group element in which an element $c_i$ indicated in Formula 6 is set, where an integer m is 1 or more and $\pi_i(1,i)$ is index information I for each integer i of i=1, ..., m $$c_i := (x_i(1, i), x_i, z, 0, 0, 0)B \in \mathbb{Z}_p^7 \text{ for } i = 1, \ldots m \quad \text{[Formula 6]}$$

where $\pi_i \xleftarrow{U} \mathbb{Z}_p,$ $x := (x_i, \ldots, x_m) \in \mathbb{Z}^m,$ $z \xleftarrow{U} \mathbb{Z}_p.$

9. A cryptographic system comprising:

an encryption device to generate a ciphertext $ct_x$ in which a vector x is encrypted, using encryption setting information of a size depending on a size of the vector x, the encryption setting information being generated using as input public information of a fixed size;
a key generation device to generate a secret key $sk_y$ in which a vector y is set, using key setting information of a size depending on a size of the vector y, the key setting information being generated using as input the public information; and
a decryption device to decrypt the ciphertext $ct_x$ generated by the encryption device with the secret key $sk_y$ generated by the key generation device to calculate an inner-product value of the vector x and the vector y,
wherein the decryption device defines the encryption setting information by a pseudorandom function, using as input the public information,
wherein the decryption device defines a matrix B as the encryption setting information, and
generates the ciphertext $ct_x$ including an element $[c_i]_1$ which is a group element in which a product of each element $x_i$ of the vector x and the matrix B is set,
wherein the decryption device generates the ciphertext $ct_x$ including an element $[c_i]_1$ which is a group element in which an element $c_i$ indicated in Formula 7 is set, where an integer m is 1 or more and a matrix $B_1$ is the matrix B for each integer i of i=1, ..., m, $$c_i := (x_i, 0, z, 0) B_i \in \mathbb{F}_p^4 \quad \text{[Formula 7]}$$

for i=1, ... m
where $$x := (x_1, \ldots, x_m) \in \mathbb{F}^m, z \in \mathbb{F}_p$$

* * * * *